US007575336B2

(12) United States Patent
Yoshida et al.

(10) Patent No.: US 7,575,336 B2

(45) Date of Patent: *Aug. 18, 2009

(54) INDIRECTOR LIGHT FIXTURE

(75) Inventors: Michael K. Yoshida, Monmouth Junction, NJ (US); Thomas Russello, Freehold, NJ (US)

(73) Assignee: Genlyte Thomas Group LLC, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/965,857

(22) Filed: Dec. 28, 2007

(65) Prior Publication Data

US 2008/0101075 A1 May 1, 2008

Related U.S. Application Data

(60) Division of application No. 11/028,083, filed on Jan. 3, 2005, now Pat. No. 7,325,938, which is a continuation-in-part of application No. 10/453,217, filed on Jun. 3, 2003, now Pat. No. 6,848,806.

(60) Provisional application No. 60/386,149, filed on Jun. 5, 2002.

(51) Int. Cl.
*F21S 8/00* (2006.01)
*G01C 9/32* (2006.01)

(52) U.S. Cl. ....................... 362/147; 362/269; 362/427; 33/348.2

(58) Field of Classification Search ................. 362/147, 362/145, 260, 269, 285, 370, 371, 418, 419, 362/427; 33/348, 348.2
See application file for complete search history.

(56) References Cited

U.S. PATENT DOCUMENTS

| | | | |
|---|---|---|---|
| 1,388,221 | A | 8/1921 | Toepfer |
| 1,539,131 | A | 5/1925 | McCarley |
| 1,633,837 | A | 6/1927 | Youtz |
| 2,166,394 | A | 7/1939 | Crossley |
| 2,288,166 | A | 6/1942 | Kucher |
| 2,313,131 | A | 3/1943 | Elias |
| 2,545,163 | A | 3/1951 | Naster |
| 2,687,867 | A | 8/1954 | Wolar |
| 2,852,663 | A | 9/1958 | Stuffer et al. |
| 2,960,361 | A | 11/1960 | Boutelle |
| 2,971,737 | A | 2/1961 | Parker |
| 2,973,895 | A | 3/1961 | Brown et al. |
| 3,078,366 | A | 2/1963 | Winkler |
| 3,082,987 | A | 3/1963 | Robinson |
| 3,154,704 | A | 10/1964 | Shaffer |
| 3,251,987 | A | 5/1966 | Wince |
| 3,299,200 | A | 1/1967 | Sulzer |
| 3,299,265 | A | 1/1967 | Rackley et al. |
| 3,319,203 | A | 5/1967 | Haughney |
| 3,340,393 | A | 9/1967 | Frank et al. |
| 3,388,246 | A | 6/1968 | Bailey |
| 3,433,449 | A | 3/1969 | Musante |
| 3,448,260 | A | 6/1969 | Wince et al. |
| 3,479,081 | A | 11/1969 | Schaaf |

(Continued)

*Primary Examiner*—John A Ward
(74) *Attorney, Agent, or Firm*—James E. Cole; Middleton Reutlinger

(57) ABSTRACT

An indirector light fixture in combination with a leveling device which is utilized to position the light fixture at least one of a plurality of preselected angles. A method is also described for positioning the fixture at the at least one of the preselected angles.

14 Claims, 24 Drawing Sheets

U.S. PATENT DOCUMENTS

| | | | | |
|---|---|---|---|---|
| 3,505,515 | A | 4/1970 | Adra | |
| 3,541,478 | A | 11/1970 | Peterson et al. | |
| 3,604,916 | A | 9/1971 | Adra et al. | |
| 3,754,724 | A | 8/1973 | Osowski | |
| 3,778,610 | A | 12/1973 | Wolf | |
| 3,852,588 | A | 12/1974 | Grawford | |
| 3,991,905 | A | 11/1976 | Nicpon | |
| 4,000,406 | A | 12/1976 | Bhavsar | |
| 4,090,210 | A | 5/1978 | Wehling et al. | |
| 4,112,483 | A | 9/1978 | Small, Jr. et al. | |
| 4,143,413 | A | 3/1979 | Kelly | |
| 4,173,037 | A | 10/1979 | Henderson, Jr. et al. | |
| 4,212,050 | A | 7/1980 | Trenkler | |
| 4,254,456 | A | 3/1981 | Grindle et al. | |
| 4,310,876 | A | 1/1982 | Small, Jr. et al. | |
| 4,319,313 | A | 3/1982 | Eberhart et al. | |
| 4,333,131 | A | 6/1982 | Hujimoto et al. | |
| 4,337,507 | A | 6/1982 | Lasker | |
| 4,403,278 | A | 9/1983 | Flood | |
| 4,414,616 | A | 11/1983 | de Vos et al. | |
| 4,422,135 | A | 12/1983 | McCamy | |
| 4,449,168 | A | 5/1984 | Ewing | |
| 4,459,648 | A | 7/1984 | Ullman | |
| 4,460,948 | A | 7/1984 | Malola | |
| 4,462,068 | A | 7/1984 | Shadwick | |
| 4,473,873 | A | 9/1984 | Quiogue | |
| 4,527,224 | A | 7/1985 | Sangiamo et al. | |
| 4,587,602 | A | 5/1986 | Dean et al. | |
| 4,590,544 | A | 5/1986 | Decandia | |
| 4,623,956 | A | 11/1986 | Conti | |
| 4,709,890 | A | 12/1987 | Moore | |
| 4,760,511 | A | 7/1988 | Russello et al. | |
| 4,794,501 | A | 12/1988 | Bartenbach | |
| 4,893,224 | A | 1/1990 | Tinley | |
| 4,970,634 | A | 11/1990 | Howell et al. | |
| 5,016,150 | A | 5/1991 | Gordin et al. | |
| 5,068,769 | A | 11/1991 | Umeda et al. | |
| 5,111,371 | A | 5/1992 | Nielson | |
| 5,249,110 | A | 9/1993 | Russello et al. | |
| 5,307,254 | A | 4/1994 | Russello et al. | |
| 5,309,341 | A | 5/1994 | Russello et al. | |
| 5,323,995 | A | 6/1994 | Grittman et al. | |
| 5,339,234 | A | 8/1994 | Russello et al. | |
| 5,442,132 | A | 8/1995 | Sandell et al. | |
| 5,613,766 | A | 3/1997 | Raouf | |
| 5,642,934 | A | 7/1997 | Haddad | |
| 5,647,659 | A | 7/1997 | Mori | |
| 5,690,419 | A | 11/1997 | Siems | |
| 5,704,710 | A | 1/1998 | Greene et al. | |
| 5,722,770 | A | 3/1998 | Douglas | |
| 5,803,585 | A | 9/1998 | Littman et al. | |
| 5,906,431 | A | 5/1999 | Chianale et al. | |
| 6,059,424 | A | 5/2000 | Kotloff | |
| 6,116,564 | A | 9/2000 | Cates | |
| 6,282,805 | B1 * | 9/2001 | Cosentino | 33/374 |
| 6,290,376 | B1 | 9/2001 | Gutierrez et al. | |
| 6,375,141 | B1 | 4/2002 | Kettlestrings | |
| 6,517,216 | B1 | 2/2003 | Cercone et al. | |
| 6,530,681 | B2 | 3/2003 | Sieczkowski | |
| 6,607,292 | B2 | 8/2003 | Gutierrez et al. | |
| 6,733,158 | B2 | 5/2004 | Fischer et al. | |
| 6,848,806 | B2 | 2/2005 | Yoshida et al. | |
| 6,905,222 | B1 | 6/2005 | Russello et al. | |
| 7,090,382 | B2 | 8/2006 | Haddad et al. | |
| 7,121,684 | B2 | 10/2006 | Barozzini et al. | |
| 7,150,542 | B1 | 12/2006 | Russello et al. | |
| 7,244,050 | B2 | 7/2007 | Summerford et al. | |
| 7,296,914 | B1 | 11/2007 | Russello et al. | |
| 7,325,938 | B2 * | 2/2008 | Yoshida et al. | 362/147 |
| 2005/0117333 | A1 | 6/2005 | Yoshida et al. | |

* cited by examiner

INDIRECTOR LIGHT FIXTURE

CROSS REFERENCE TO RELATED APPLICATIONS

This divisional application under 35 USC § 120 claims priority to, and benefit from, U.S. application Ser. No. 11/028,083, filed on Jan. 3, 2005, entitled "Indirector Light Fixture," which is a continuation-in-part application of U.S. application Ser. No. 10/453,217, filed Jun. 3, 2003, which issued under U.S. Pat. No. 6,848,806 on Feb. 1, 2005, which was a utility application of U.S. Provisional Application No. 60/386,149, filed Jun. 5, 2002.

FIELD OF THE INVENTION

The present invention is directed towards an indirector light fixture for either ceiling or wall mount which is easily adjustable into position. More specifically, the present invention provides an indirector light fixture mountable in and adjustable to a plurality of configurations and each of which may utilize a visor to inhibit glare.

SUMMARY OF THE INVENTION

One aspect of the present invention is to provide an indirector light fixture which may be readily mounted on either a vertical or horizontal ceiling surface.

A further aspect of the present invention is to provide an indirector light fixture which has a light fixture head attached to a ballast housing wherein the fixture head is easily adjustable relative to the ballast housing.

A further aspect of the present invention is to provide a light fixture head or reflector housing which is rotatable about a hinge pin affixed to a ballast housing, the light fixture head being automatically adjustable through a ratchet and pawl mechanism for support and adjustment relative to the ballast housing.

A further aspect of the present invention is to provide an indirector light fixture wherein the ballast housing and the light fixture head are electrically connected through ballast feed wires, the ballast feed wires being hidden from view.

An additional aspect of the present invention is to provide a light fixture head wherein a reflector is based, the reflector surrounding a lamp and being adjustable in order to provide a secondary adjustment mechanism for light direction adjustment.

An additional aspect of the present invention is to provide an indirector light fixture wherein the light fixture head or reflector housing has a ratchet and pawl mechanism for support of the light fixture head relative to the ballast housing and wherein the fixture head and support arm will travel in increments thereby locking the fixture head in place to support the fixture head through a ratchet and pawl mechanism or other supporting device inter-connected between the fixture head and the ballast housing.

An even further aspect of the present invention is to provide an indirector light fixture having a visor assembly fastened thereto.

Still an even further aspect of the present invention is to provide an indirector light fixture with an integral visor formed with the fixture head.

Yet a still further aspect of the present invention is an indirector light fixture defining a pendent assembly.

These and other objects of the invention are accomplished with the indirector light fixture of the present invention. The indirector light fixture of the present invention has a ballast housing and fixture head or reflector housing which is attached together such that the reflector housing may be supported relative to the ballast housing. The reflector housing may be attached to the ballast housing by a support arm which may have a pivot point relative to both the reflector housing and the ballast housing. Additionally, the support arm may be provided with a ratchet and pawl mechanism for allowing adequate support of the reflector housing in a stable position.

The indirector light fixture of the present invention surrounds a lamp with a position adjustable reflector which provides a secondary adjustment mechanism for positional direction of the light emitted by the lamp. The adjustable reflector within the reflector housing or lamp head may be readily accessible and easily adjustable in addition to the ratchet and pawl adjustment mechanism provided for positioning of the reflector housing relative to the ballast housing.

The present invention is therefore directed towards an indirector light fixture which has a ballast housing and a reflector housing or lamp head affixed thereto, the reflector housing being adjustable relative to the ballast housing and supported in a predefined position by a ratchet and pawl adjustment mechanism which allows for adjustment and support of the reflector housing relative to the ballast housing in predefined increments and preventing downward rotation. The indirector light fixture of the present invention additionally provides a mechanism for electrical connection between the reflector housing and the ballast housing without having external ballast feed wires while still allowing relative movement between the ballast housing and the reflector housing. Additionally, the indirector light fixture of the present invention provides a secondary adjustment mechanism for the direction of light emitted from the reflector housing by direct adjustment of the reflector within the reflector housing.

These and other objects of the present invention are met by the indirector light fixture described herein. However, many other objects of the invention and various aspects of the present invention may be interpreted from the teachings herewith and no unnecessary limitations are to be construed from the specific aspects or objectives outlined herein without also taking into consideration the entire specification, claims and drawings which are a part hereof.

BRIEF DESCRIPTION OF THE DRAWINGS

A better understanding of the invention will be had upon reference to the following description in conjunction with the accompanying drawings and which, like numerals, refer to like parts throughout the several views and wherein.

DETAILED DESCRIPTION OF THE PREFERRED EMBODIMENT

Figure 1:
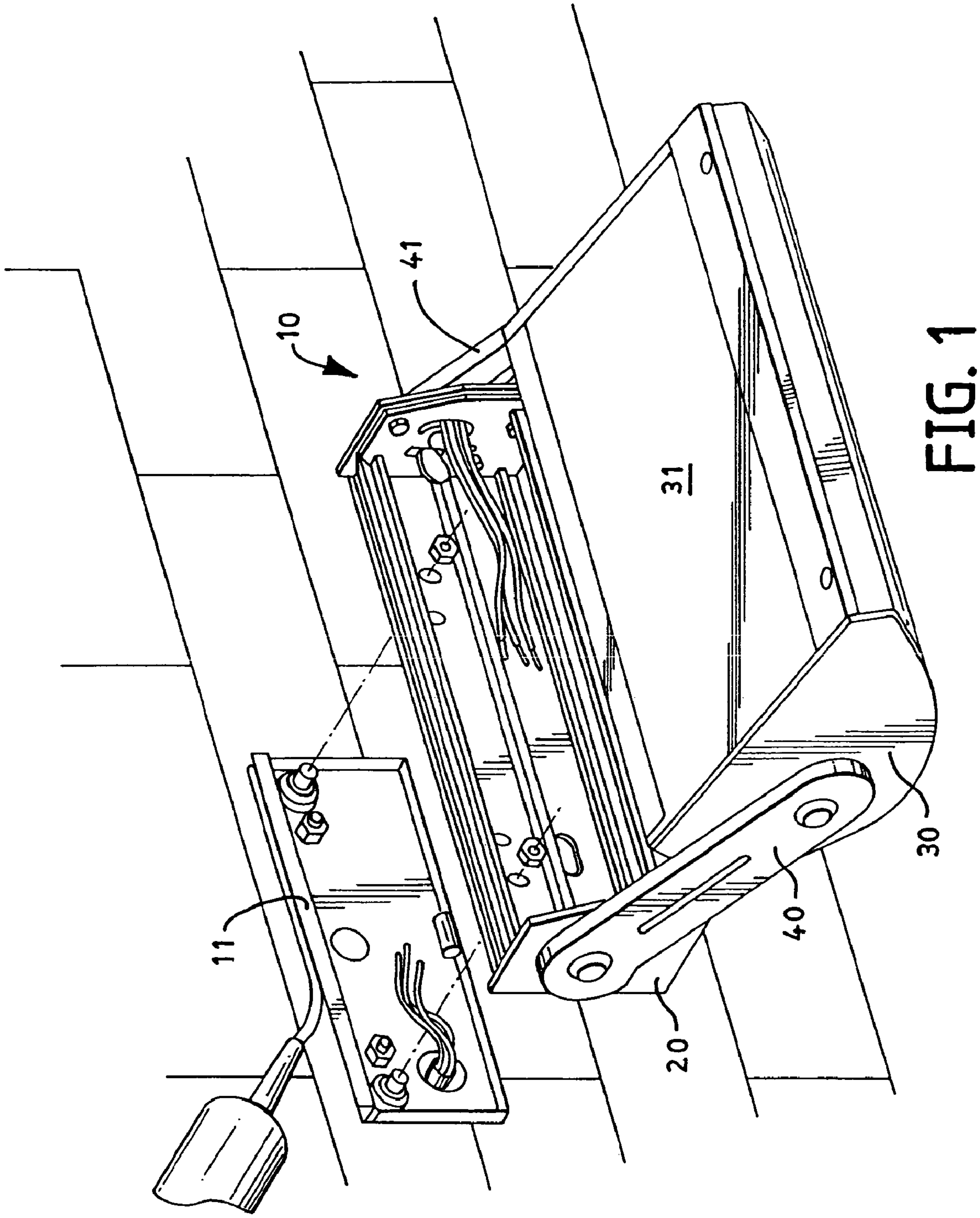
FIG. 1 is a perspective view of the indirector light fixture of the present invention partially disassembled from the wall mount plate.

The indirector light fixture 10 of the present invention is depicted in FIG. 1. As shown therein, the reflector housing or fixture head 30 is held outward from a ballast housing 20 by support arms 40, 41. The ballast housing 20, as shown in FIG. 1, may be affixed to a vertical surface, such as a wall, by a ballast house mount plate 11 which will allow the ballast housing to mount to the wall or, alternatively, to a ceiling.

As shown in FIG. 1, the indirector light fixture 10 of the present invention has a mount plate 11, ballast housing 20, reflector housing 30 and a lens cover 31. Within the ballast housing are the ballast and other electronics necessary for providing adequate electrical current to the lamp 33 contained within the reflector housing 30. As is typically the case, the ballast electronics contained within the ballast housing are separated from the lamp within the reflector housing 30 such that the heating characteristics of the two elements remain separate and therefore do not cause overheating conditions. However, alternative electrical connection and assemblies may be utilized while also incorporating the various features of the present invention and the specific electrical connections as well as electrical configurations depicted herein should not be considered limiting. As such, the present invention covers such alternative connections and assembly constructs such as combination ballast electronics and lamp electronics.

As further shown in FIG. 1, it is apparent that the support arms 40, 41 may rotate about a hinge or pivot point on one or both of the ballast housing 20 and the reflector housing 30. This allows for accurate adjustment of the lens and reflector housing 31, 30 such that the ballast housing and mount plate, when mounted to either a vertical or horizontal surface, may not negatively impact the direction of the light output from the lamp and reflector housing.

Figure 2:
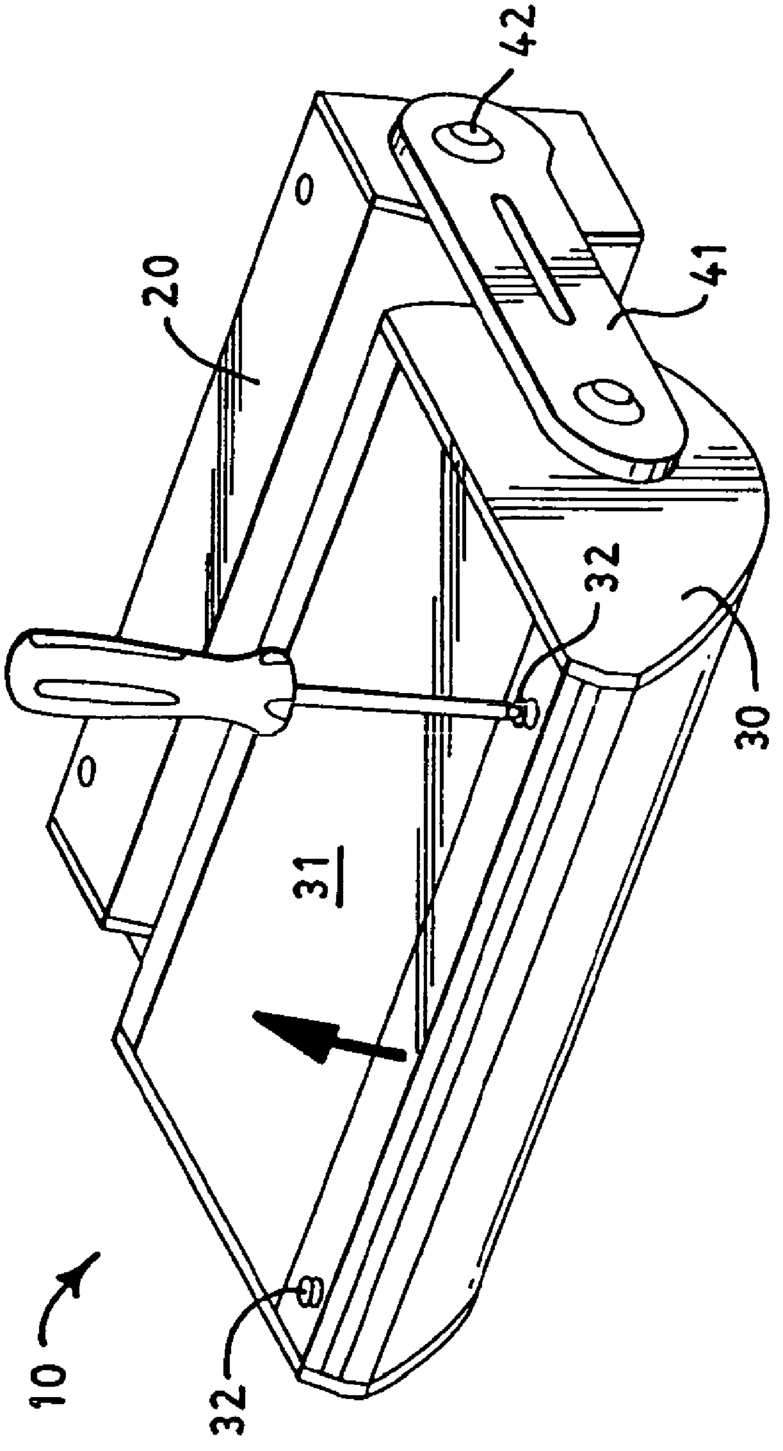
FIG. 2 is a perspective view of the indirector light fixture of the present invention.
Figure 3:
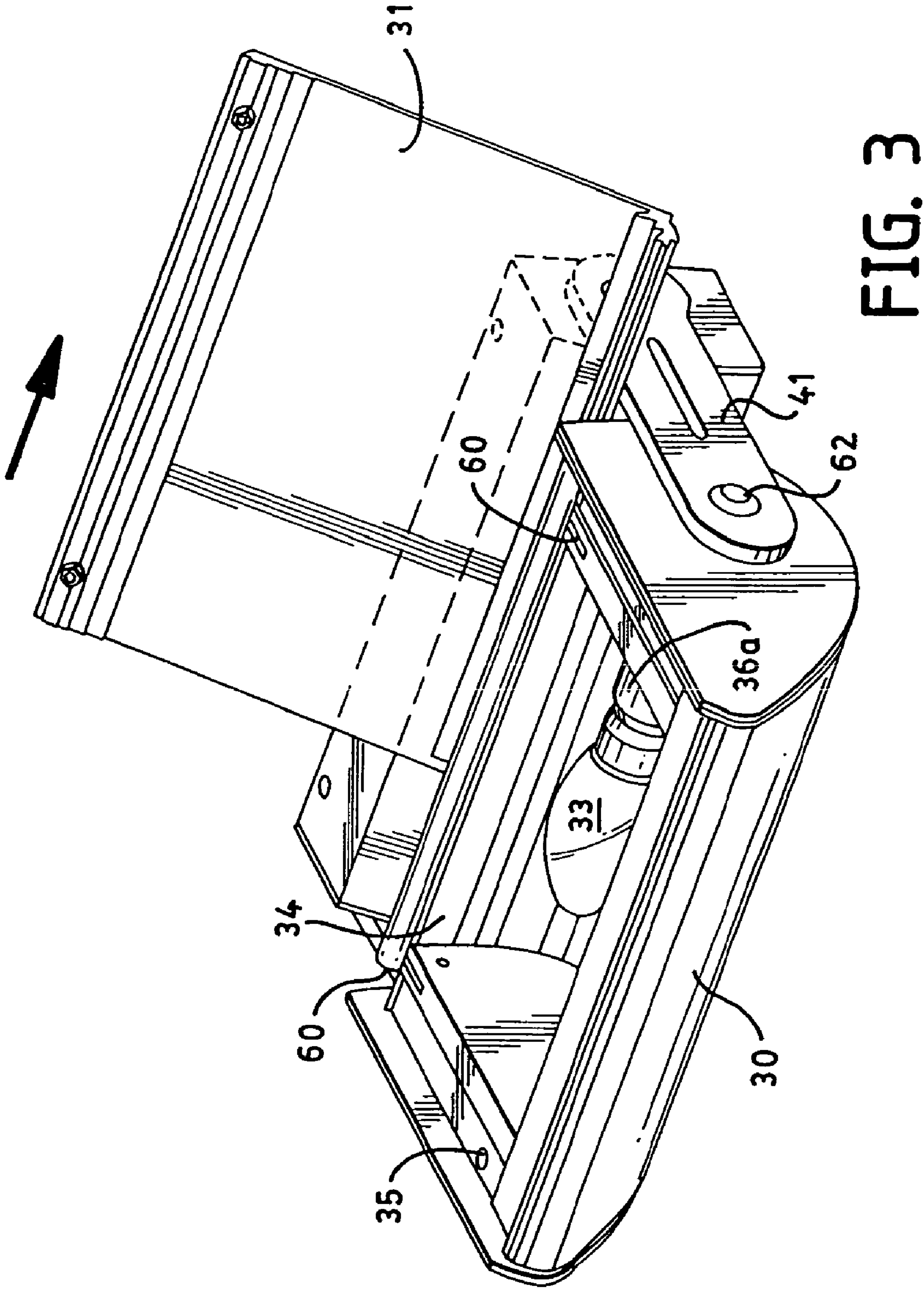
FIG. 3 is a perspective view of the indirector light fixture of the present invention with the lens partially removed.

As shown in FIG. 2 and in FIG. 3, access to the interior of the reflector housing 30 may be accomplished by loosening of the lens attachment screws 32. After removal of the screws 32, the lens may be raised thereby exposing the interior of the reflector housing 30 as depicted in FIG. 3. As depicted in both FIG. 2 and FIG. 3, removal of the lens attachments screws 32 allows the lens to be raised and then slid outward from the rear portion of the reflector housing. The reflector housing 30 may therefore be exposed allowing access to the interior of the housing and exposing the lamp socket 36*a* and lamp 33. Such access may be desirable for servicing of the indirector light fixture 10, replacement of the lamp 33 or adjustment of the reflector 34 contained within the reflector housing 30.

Lamp 33 may be a high intensity discharge (HID) lamp in order to increase the output luminosity of the indirector light fixture 10 of the present invention. Of course, other lamps or light emission device may be utilized within the reflector housing 30 of the present invention such as ARC lamps, compact fluorescent or other light sources.

Figure 4:
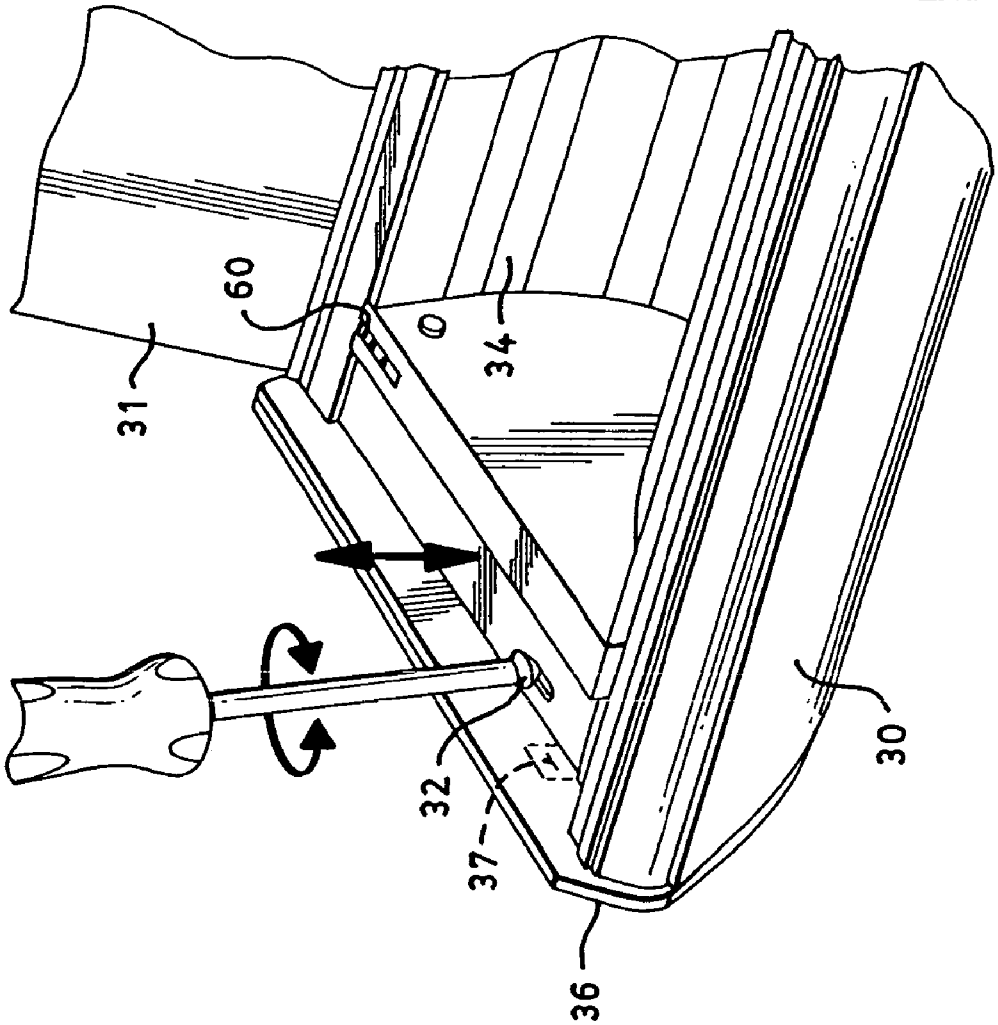
FIG. 4 is a close up perspective view of the reflector assembly adjustment mechanism of the present invention.

As shown in combination with FIG. 3 and FIG. 4, the reflector 34 retained within the reflector housing 30 may be adjustable. The reflector 34 may be hingedly affixed to a rear portion of the reflector housing 30 by hinge members 60 such that the reflector 34 may be adjusted within the reflector housing. As shown in FIG. 3 and FIG. 4, the reflector housing may be adjusted by the reflector adjustment screws 35 placed along the forward or front portion of the side of the reflector 34. As can be seen in conjunction with the exploded view of the light fixture in FIG. 6, the adjustment screws retain the reflector within the reflector housing at a desired angle by biasing the reflector upward through the use of reflector bias springs 35*a* which force the reflector upward against the head of the reflector screws 35 in combination with the hinges 60. As such, as depicted in FIG. 4 and FIG. 3, the reflector may be adjusted internally of the reflector housing by either tightening or loosening the reflector screw 35.

Further, as shown in FIG. 4, along the inner side wall of the reflector housing side wall 36 are the reflector angle markings 37 which allows the user to adjust the internal reflector to a predefined angle of deflection. As shown in the figures, the reflector 34 may be field adjusted upwards or downwards for customer desired light distribution. A deflection of up to 10° may be provided utilizing the adjustment screws 35 but increased deflection may be accomplished by increasing the adjustment screw length 35 in combination with the biasing springs 35*a*.

Figure 6:
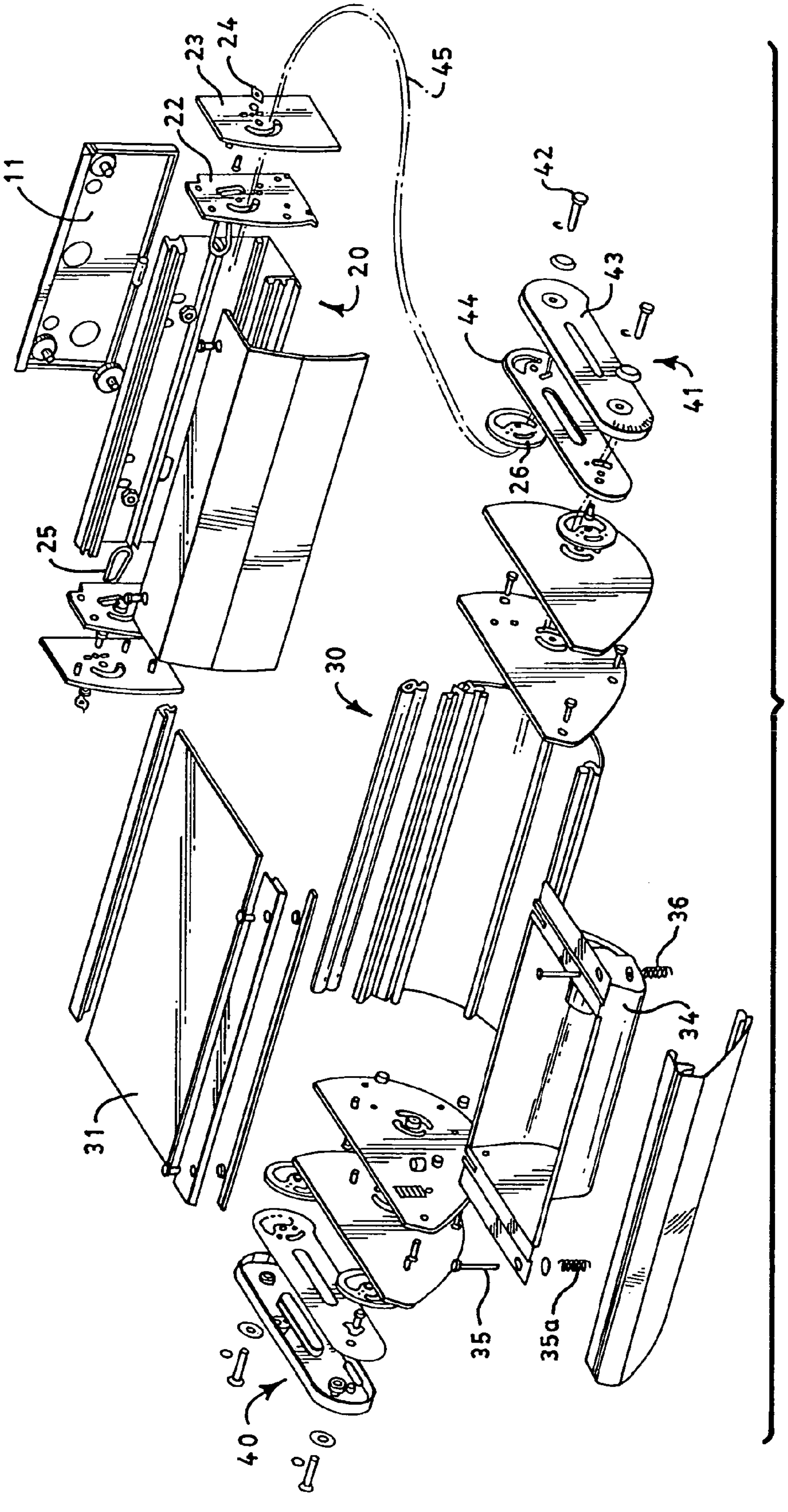
FIG. 6 is an exploded view of the indirector light fixture of the present invention.

As shown in the figures, the internal reflector 34 may be adjusted about the hinges 60 thereby causing deflection of the light without movement of the reflector housing 30 or support arms 40 and 41. Thus, the reflector adjustment screws 35 provide an alternative means for adjustment of the internal reflector 34. As can be seen in FIG. 6, the reflector adjustment screws 35 extend through the apertures in the sides of the reflector 34 and extend downward into threaded openings within the reflector housing 30. Interposed therebetween are the biasing springs 35*a* thereby forcing upward bias against washers and, concurrently, the underside of the frame of the reflector 34 thereby causing the reflector 34 to rotate about hinge members 60. Markings 37 can provide an indication as to the degree to which the reflector is adjusted relative to the flat horizontal plane defined by the top of the reflector housing 30 and lens 31. Of course, if the reflector housing 30 is not at a level position due to the adjustment of the support arms 40 and 41, additional measurements may be necessary in order to properly position the reflector 34 to the desired angular displacement.

Figure 5C:
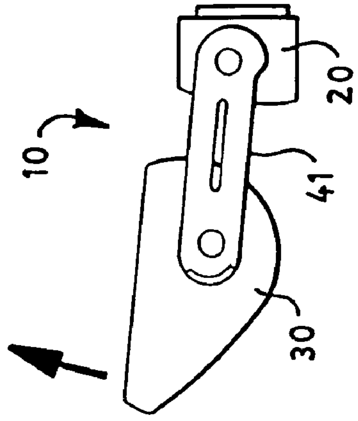
FIG. 5*a*-5*c* is a side view of the indirector light fixture of the present invention in the various stages of adjustment using the support arm.
Figure 5B:
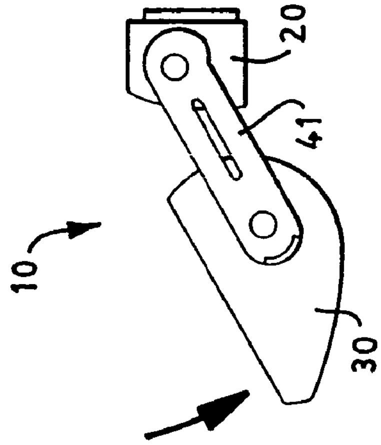
Figure 5A:
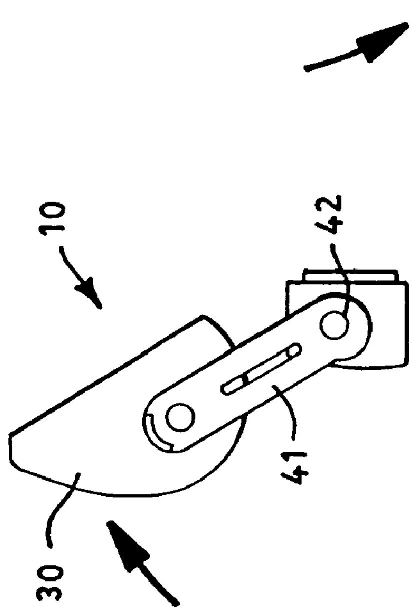

Turning to FIG. 5-10, an alternative mechanism for adjusting the reflector housing and the support arm angle is provided within the support arms and ballast housing connection. As shown in FIG. 5 wherein a single side of the indirector light fixture 10 of the present invention is depicted, the support arm may be positioned relative to the mounted ballast housing 20 such that the reflector housing 30 is properly positioned to a desired level. FIG. 5 depicts only a single support arm but both support arms may incorporate the ratchet and pawl mechanism described herein. As shown in the figures, the support arm 41 may be adjusted to a desired angle relative to the ballast housing 20. The support arm 41, which supports the reflector housing 30 relative to the ballast housing 20 as the ballast housing 20 is mounted to a wall or ceiling, maintains the reflector housing 30 in a supported position preventing the downward travel of the reflector housing about the hinge pin 42. The support arm 41 is maintained in the supported position by a ratchet and pawl mechanism integrated into the support arm 41 and the ballast side wall 22 and support plate 23. The ratchet and pawl mechanism will allow for the upward or clockwise rotation of the reflector housing 30 about hinge pin 42 while preventing downward travel or counter clockwise travel about hinge pin 42. The design of the ratchet and pawl integrated within the support arm 41 will therefore allow for adjustment of the support arm angle upward and lock the reflector housing in place while allowing upward travel at 15° increments. Various incremental displacements from the ballast housing 20 may be provided, for example, if the ballast housing is mounted along a vertical wall as depicted, the ratchet and pawl mechanism may allow for support from 30° downward from a horizontal plane to 60° up from the same horizontal plane. As depicted in FIG. 5*a*-5*c*, various aspects of the ratchet and pawl construction within the support arm 41 are provided. As will be described herein within the ratchet and pawl assembly, the reflector housing can be raised to its upright position as depicted in FIG. 5*a* to release the pawl from the ratchet teeth thereby allowing for downward travel and resetting of the fixture head and any desired position within the increments supported as is shown in FIGS. 5*b* and 5*c*.

Figure 7:
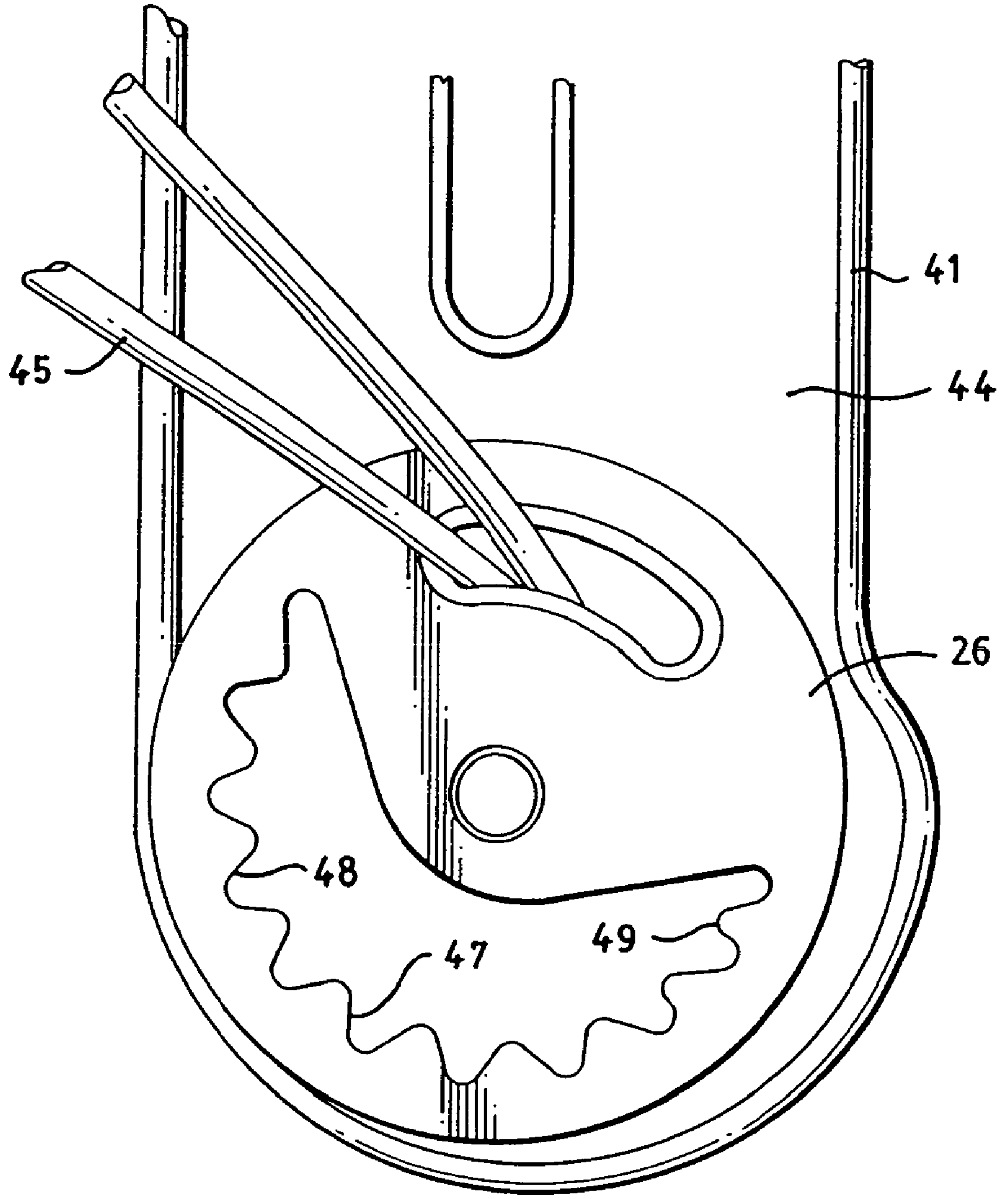
FIG. 7 is a close up view of the support arm ratchet teeth of the present invention.

As shown in conjunction with FIGS. 6, 7, 8 and 9, the support arm 41 has formed therein a first distal end ratchet teeth 47 as depicted in FIG. 7. The support arm 41, as seen in FIG. 6, is comprised of inner plate 44 and outer plate 43 with sliding cover 26 positioned between the inner plate 44 and support mount plate 23. Support arm 41 has formed a plurality of ratchet teeth 47 which work in combination with a pawl residing on the outer surface of support mount plate 23. The pawl 24 works in conjunction with the ratchet teeth to prevent downward or counter clockwise travel of the support arm and reflector housing about pin 42. As can be seen in conjunction with FIGS. 7, 8, 9 and 10, the ratchet and pawl design integrated within the support arm 41 and support mount plate 23 allows the reflector housing to be positioned at a desired level while supporting the reflector housing 30 in a desired position.

As seen in FIG. 7, the ratchet teeth 47 are positioned along an interior surface of the support arm 41. As previously indicated, the inner plate 44 and outer plate 43 of the support arm 41 forms a hollow area therebetween thereby creating the opening within which the ratchet teeth 47 are formed. The ratchet teeth work in conjunction with the open or reset position 48 within the teeth as well as the closing ratchet 49 which are designed to position the pawl 24 in a desired orientation relative to the ratchet 47.

As indicated, the desired functionality of the ratchet and pawl mechanism integrated design set forth within the support arm 41 and support mount plate 23 is such that the pawl 24 prevents downward or counter clockwise rotation about hinge pin 42. However it is desirable that the reflector housing 30 may be rotated clockwise about the hinge pin 42 and allows proper support of the reflector housing 30 thereby preventing counter clockwise rotation. Additionally it is desired that the ratchet and pawl mechanism allow the pawl 24 to be reset so that when the reflector housing and support arm are positioned at its upper most position as depicted in FIG. 5*a*, the pawl 24 is placed in an inactive position thereby preventing the pawl tooth 39, shown in FIG. 8, from engaging the ratchet teeth 47 on support arm 41. Thus, when the reflector housing 30 and support arm 41 are positioned as depicted in FIG. 5*a*, the pawl is forced into the unengaged position shown in FIG. 8 thereby preventing the pawl tooth 39 from engaging the ratchet teeth 47. In such a position when the reflector housing is positioned to reset the ratchet and pawl mechanism, the pawl tooth 39 is positioned within the open reset position 48 causing the pawl tooth 39 to disengage the ratchet teeth 47. Pawl bias clip 25, shown in the figures, retains the pawl in the desired position by having first clip end 29 and second clip end 28 maintain the pawl in the proper orientation. Thus, as depicted in FIG. 8, the pawl 24 is maintained in the unengaged position thereby preventing the pawl tooth 39 from engaging the ratchet teeth 47.

Figure 8:
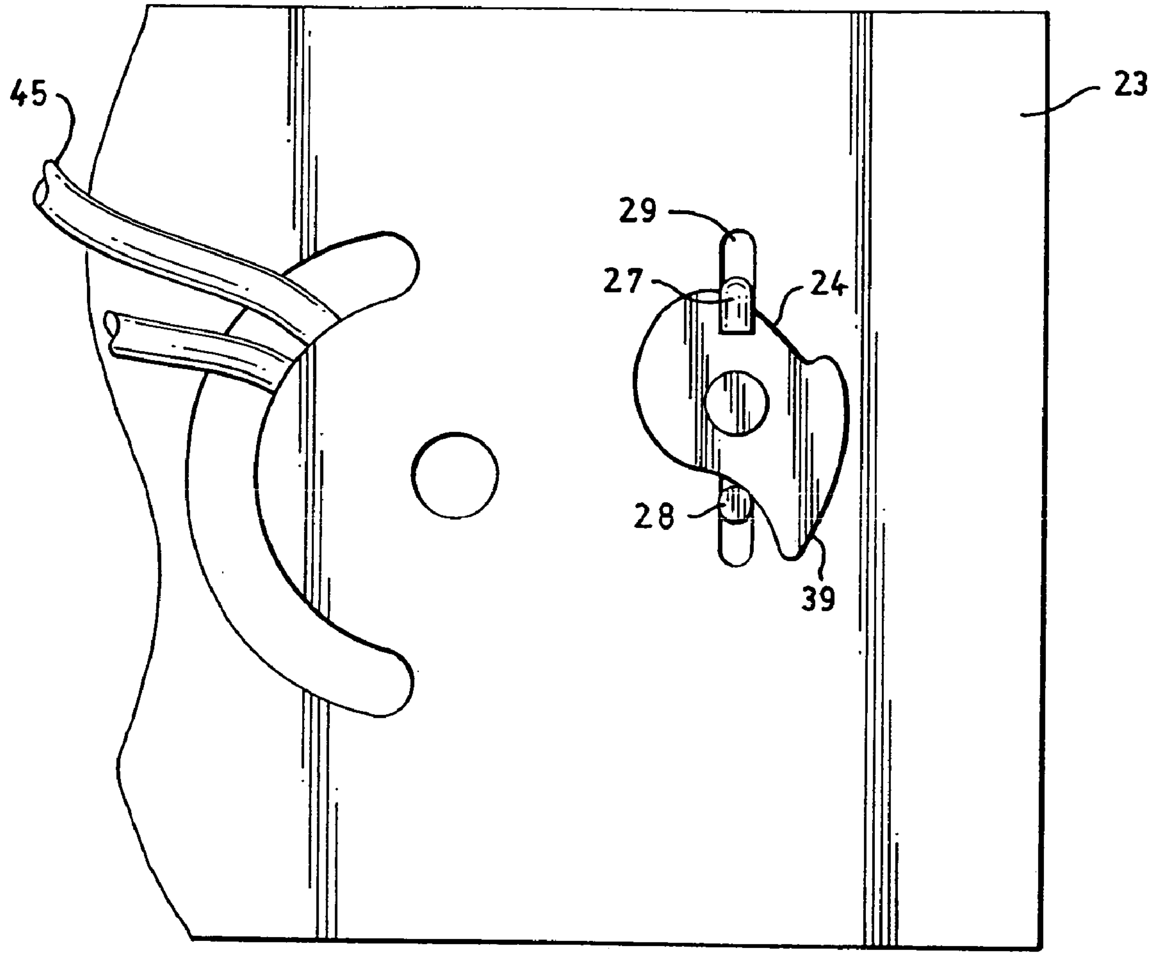
FIG. 8 is a close up view of the pawl assembly on the side of the ballast housing.
Figure 9:
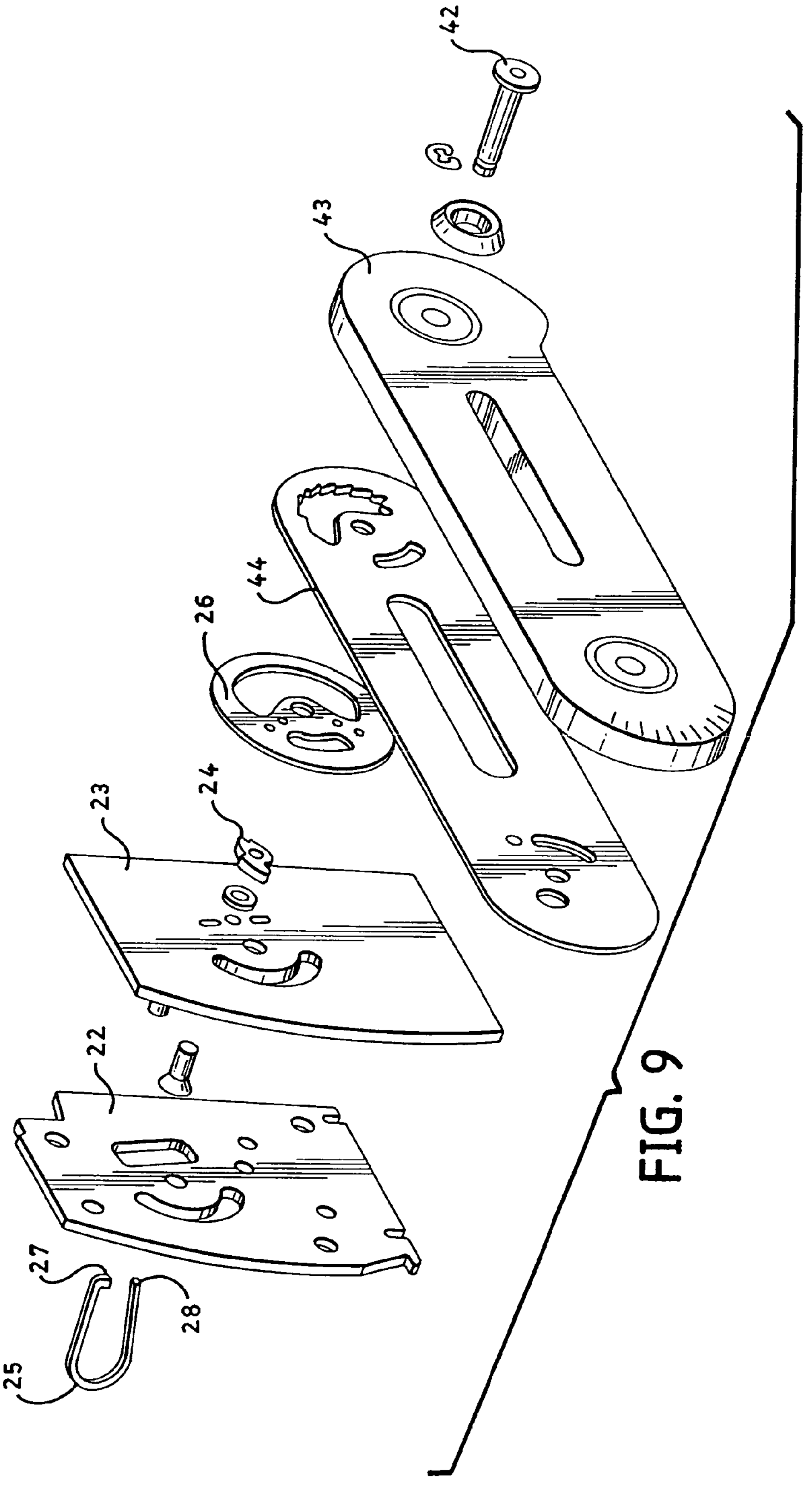
FIG. 9 is an exploded view of the ratchet and pawl mechanism between the support arm and side wall of the ballast housing of the present invention.

As seen in FIG. 8, the support mount plate 23, which is mounted on the end of the ballast housing 20 adjacent the ballast housing side wall 22, allows the pawl 24 to rotate about a center pivot point. Once the pawl 24 is in the position depicted in FIG. 8, the reflector housing 30 may be lowered to the lower most position as shown in FIG. 5*b* which causes the pawl 24 to engage the closing ratchet 49 thereby forcing the pawl to rotate and the pawl tooth 39 outward to engage ratchet teeth 47. Continued clockwise rotation of the reflector housing 30 about the hinge pin 42 allows the reflector housing to be supported in predefined increments depending on the position of the ratchet teeth 47 within the support arm 41.

Figure 10:
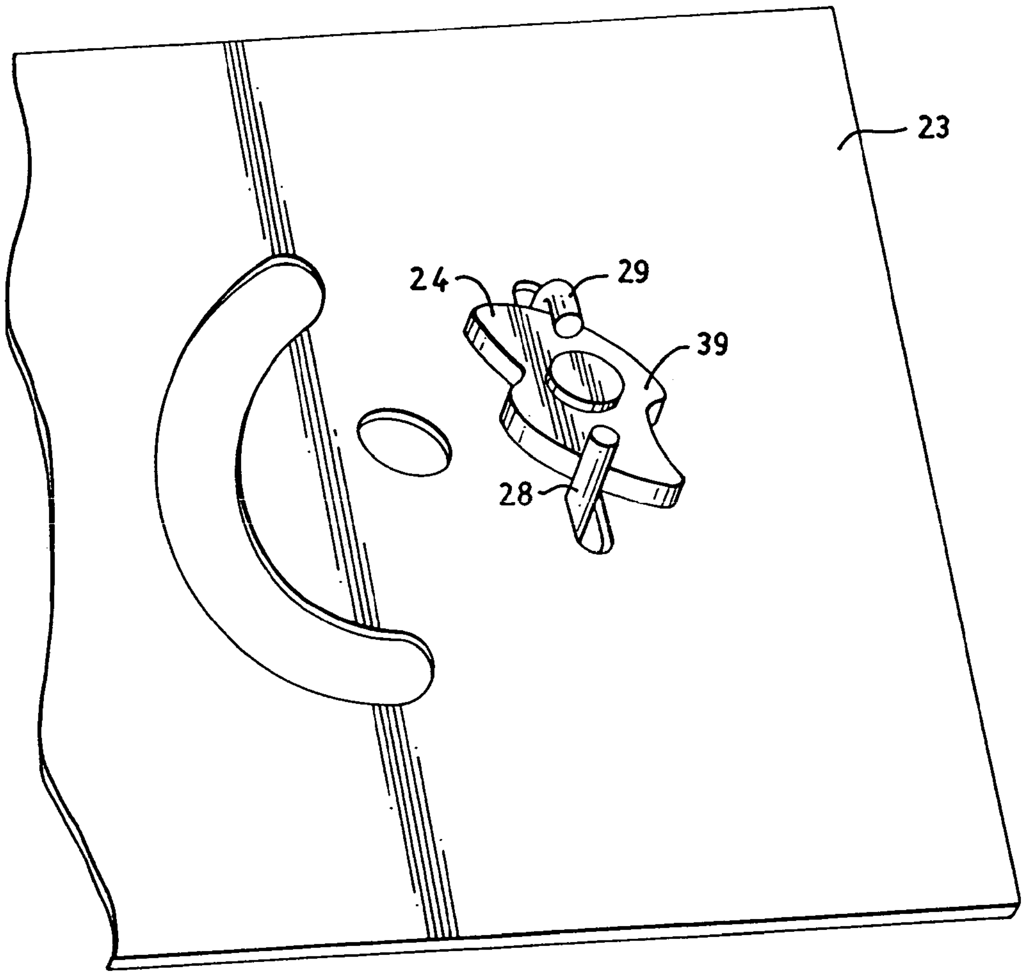
FIG. 10 is a close up view of the pawl assembly of the present invention showing the pawl in the engaged position.

As shown in FIG. 8 and FIG. 10, the pawl bias clip 25 allows for the pawl to be held or maintained in the unengaged position thereby allowing the reflector housing 30 to be reset and rotated counterclockwise about hinge pin 42. Biasing clip 25, as shown in FIG. 6, may extend through the ballast housing side wall 22 and support mount plate 23 such that the ends engage the pawl 24. However, a number of biasing mechanisms are well known in the art for properly biasing a pawl against a ratchet area or ratchet wheel. Further, the exact configuration of the ratchet and pawl mechanism depicted within the figures is not considered to be narrowing in scope as modifications to the pawl and ratchet assembly are considered to be covered that incorporated by the teachings herein. Thus, various constructions of ratchet and pawl mechanisms used in conjunction with the support arms and housing members are felt to be incorporated within the teachings hereof.

Figure 11:
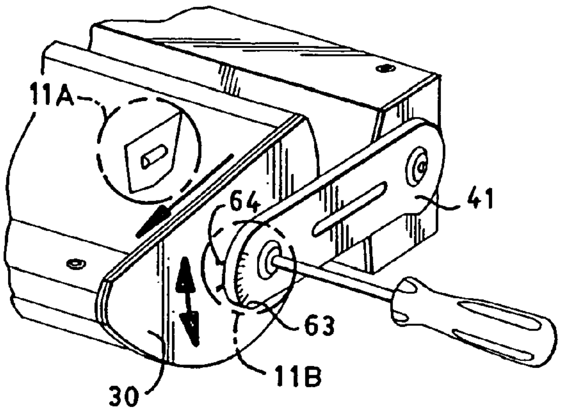
FIGS. 11, 11*a* and 11*b* is a partial perspective view of the present invention detailing the light leveler and adjustment of the head angle for the reflector housing of the present invention.

The ratchet and pawl mechanism configuration integrated within the support arm 41 described herein may be provided on a single support arm or on both support arms 40, 41 dependent upon the functionality required for support of the reflector housing. Thus, where heavier reflector housings 30 are present, it may be necessary to provide a secondary support mechanism. The support arm design which incorporates the ratchet and pawl mechanism allows for an additional method for adjusting the angle of deflection of light emitted from the reflector housing 30 in addition to altering the deflection of the actual reflector previously mentioned. Additionally, as shown in FIG. 3, pin 62 may also be loosened thereby allowing rotation of the reflector housing 30 about pin 62 on support arm 41. An additional pin may be provided on support arm 40 on the opposite side. Thus, as shown in FIGS. 11 and 11*b*, markings 63 on the support arm 41 may provide additional adjustment of the reflector housing 30 in addition to the adjustment of the reflector and adjustment of the support arms 41 in relationship to the ballast housing 20. Thus, the design of the present invention allows for three different angular adjustments of the light emitted from the reflector housing 30 depending upon the end users needs and ultimate configuration.

As depicted in the Figures, the ballast electronics are connected to the lamp by ballast feed wire 45. As seen, the ballast feed wires are positioned from the ballast housing 20 through the support arm 41 such that they are not evident on the exterior of the indirector light fixture 10 of the present invention. Thus, inner plate 44 and outer plate 43 of support arm 41 provide a hollow space through which the ballast feed wire 45 may be threaded such that the feed wires 45 extend from the ballast housing 20, through the interior of support arm 41 between inner plate 44 and outer plate 43 and into the interior of the reflector housing 30 such that adequate current may be provided to lamp 30 through lamp socket 36*a*. The ballast feed wires are more readily shown in FIGS. 7 and 8 as the feed wires are threaded through the support mount plate 23 into the interior of the support arm 41. As shown in FIG. 6, the feed wires are additionally fed back through the inner plate 44 to the interior of the reflector housing 30 such that the ballast feed wires never are positioned on the exterior of any of the structure of the fixture 10. Thus, the feed wires 45 are contained entirely within the interior of the fixture thereby providing easier connection and installation of the entire fixture 10. As indicated, such a design is possible by having the interior of the support arm 41 formed between the inner plate 44 and outer plate 43 such that the wires may be fed therethrough although alternative constructs may be used to accomplish the same effect.

The indirector light fixture 10 of the present invention as described herein and shown in the drawings therefore has a plurality of mechanisms through which the reflector housing 30 may be adjusted. The reflector 34 may be adjusted within the internal construct of the reflector housing 30 by adjusting the reflector adjustment screws 35 thereby allowing the biasing springs 35*a* to raise or lower the reflector 34 within the housing 30. Alternatively, the entire reflector housing 30 and support arms 40, 41 may be raised or lowered and supported in position by a ratchet and pawl mechanism. However, a number of known support mechanisms for retaining the support arms 40, 41 in position may be utilized thereby to prevent additional rotation of the support arms relative to the mounted ballast housing 20. Additionally, the reflector housing may be further positioned relative to the housing pin 62, shown in FIG. 3, such that the housing is further aligned to the proper head angle required by the end user.

Figure 11A:
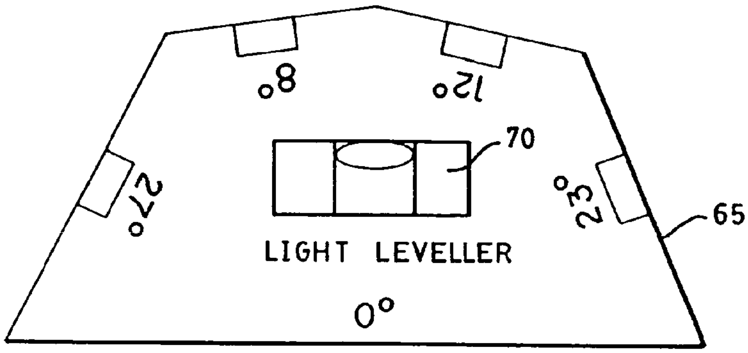
Figure 11B:
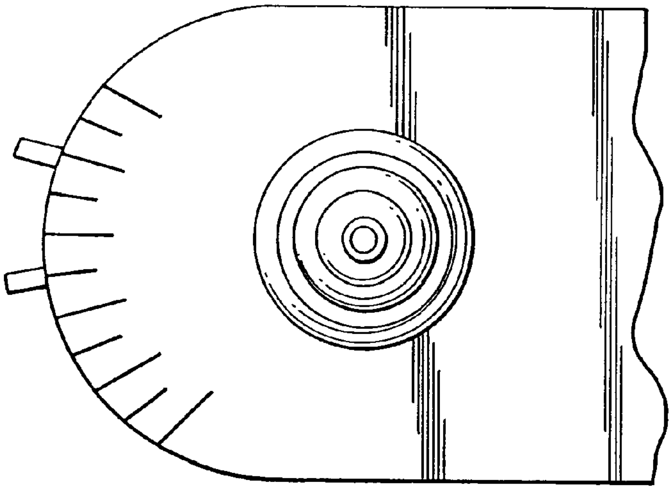

As shown in FIGS. 11 and 11*a*, the fixture 10 of the present invention may be equipped with a light leveler 65 as shown and indicated. The leveler 65 may have angular measurement sides with a level bubble 70 formed therein. As shown in the drawing, the sides may have markings and are formed at differing preselected angles such that the reflector angle may be properly adjusted upon installation. Thus, as indicated, the reflector 30 may be properly adjusted for either short or long throw positions at 0°, 8° or 12° from horizontal when the ballast housing is mounted to a wall or other vertical surface. Alternatively, when a ceiling mount is utilized, it may be desirable to adjust to 23° or 27° from vertical for angular mounting in order to provide a desirable throw of light. The bubble 70 in conjunction with the sides of the leveler being at the desired angular orientation allows for the proper adjustment of the reflector housing 30. The use of the leveler 65 in combination with the fixture of the present invention aides in the proper installation of the fixture relative to the various surfaces and allows relative ease of installation for both ceiling and wall mount. Specifically, the light leveler may include sides of a preselected angle which displaces the bubble 70. When the reflector housing 30 is adjusted to the preselected angle, the bubble 70 is leveled signifying to the installer that the reflector housing 30 is disposed at the desired position.

Figure 12A:
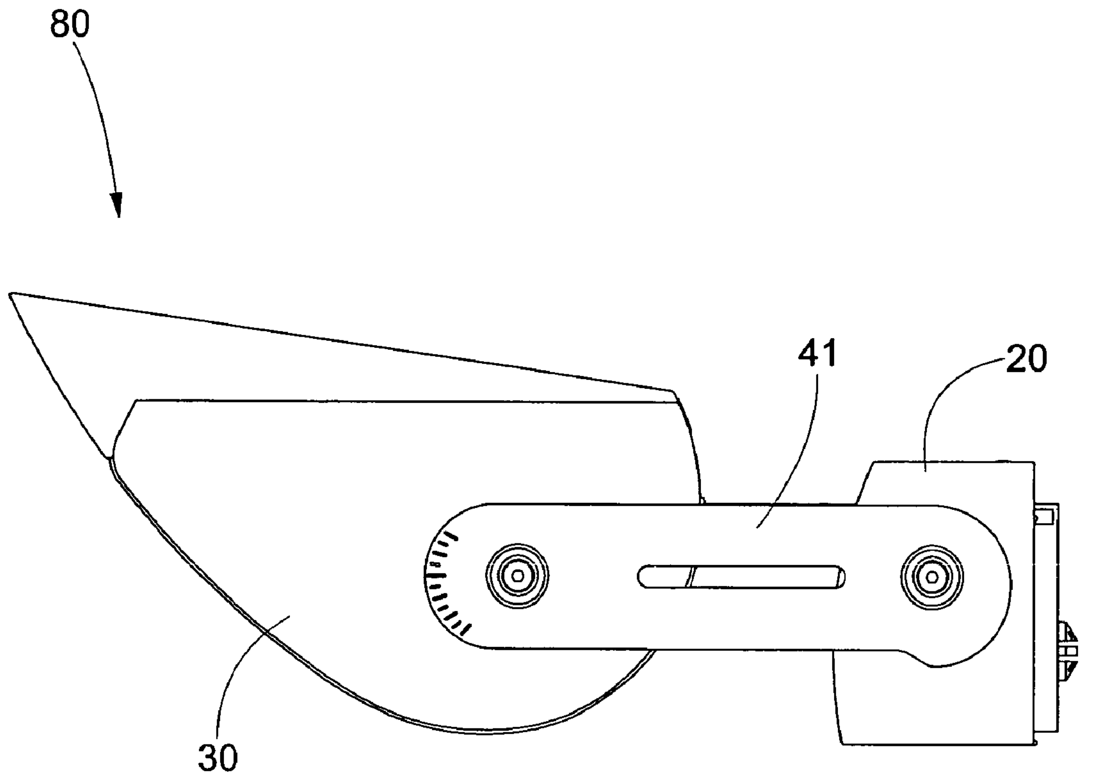
FIGS. 12A-C is a sequence of views showing installation of a visor to the light fixture of FIG. 1.
Figure 12B:
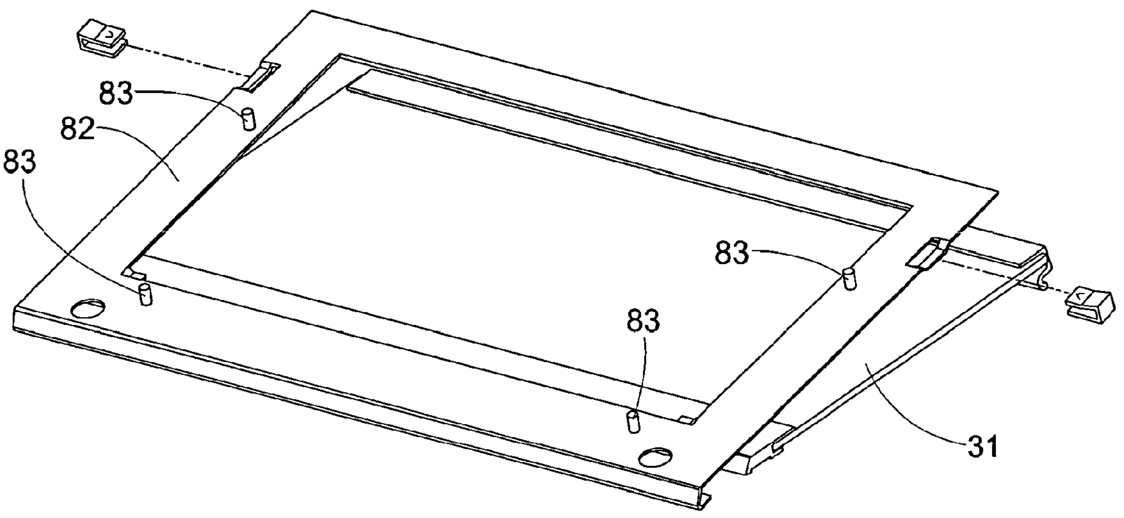
Figure 12C:
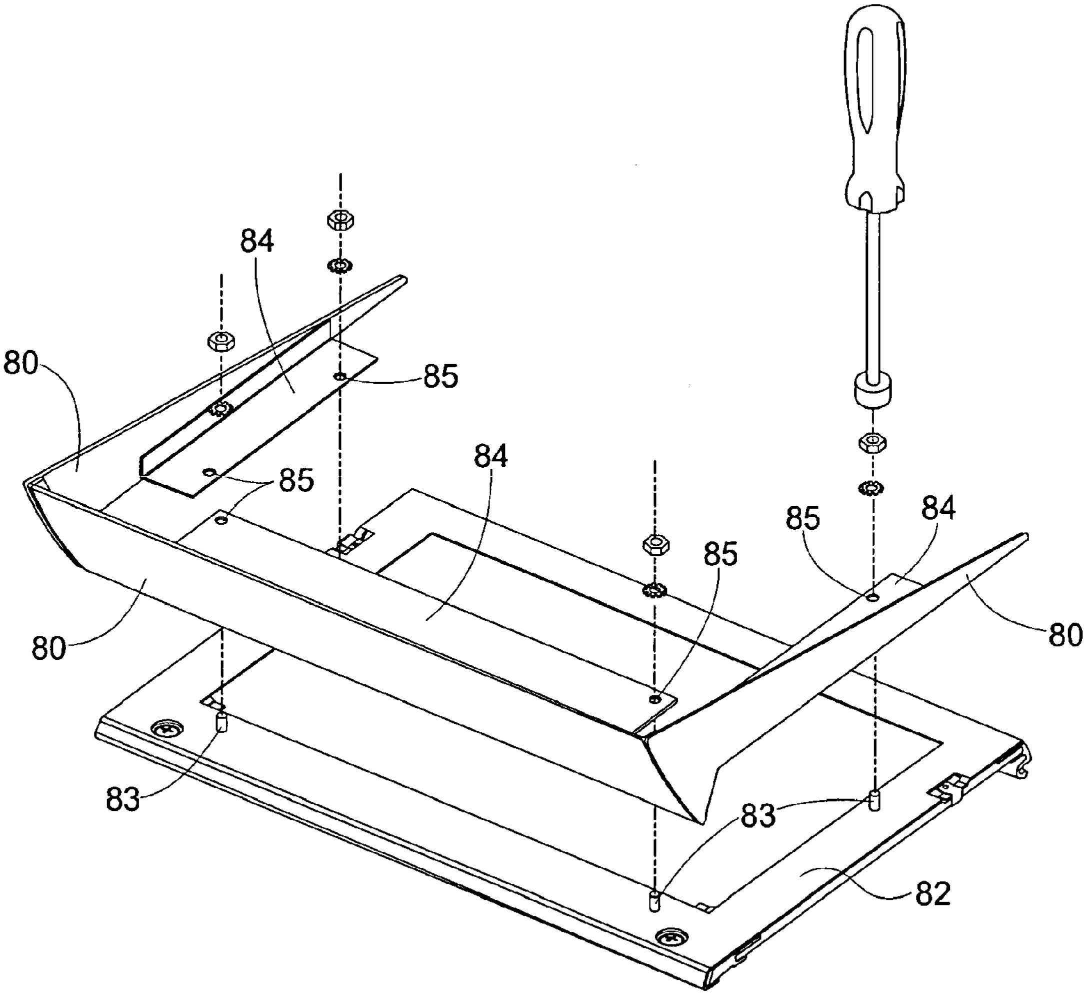
Figure 13:
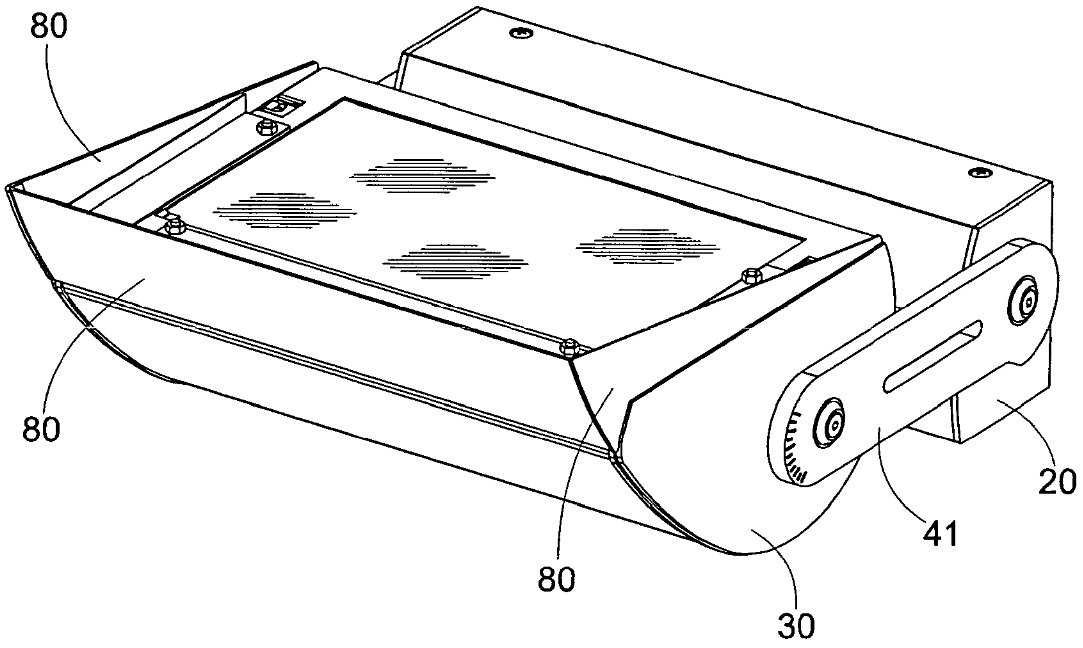
FIG. 13 is a perspective view of the indirector light fixture including visor assembly of FIG. 12.

As previously disclosed, the reflector or fixture head 30 accommodates tilting to various preset angles such as 8 degrees or 12 degrees in order to improve lighting dispersion. One problem that the inventors have discovered with the improved adjustability and light dispersion of the indirector fixture head 30 is that when the front edge of the fixture head 30 is adjusted downwardly to either of these preset angles, persons at some distance from the fixture 10 may see the top of the fixture head 30 and consequently an uncomfortable eye-straining glare. Referring now to FIG. 12, in order to overcome this glare problem, a visor assembly has been developed for use with the indirector light fixture head 30 which functions to inhibit glare associated with the fixture head 30. The visor assembly includes a visor 80 and a mounting plate 82. Referring now to FIG. 12A, a side view is shown depicting the visor 80 attached to the fixture head 30. In order to fasten the visor 80 to the fixture head 30, the lens cover 31 is removed as shown in FIG. 12B wherein the visor mounting plate 82 is positioned over the lens cover 31. The visor mounting plate 82 is fastened to the lens cover 31 using fastening apertures on the front edge of the lens cover 31 and clips along the sides of the plate 82. Extending from the upper edge of the mounting plate 82 are a plurality of threaded studs 83. Referring now to FIG. 12C, the visor 80 is shown being positioned on the mounting plate 82. More specifically, the visor 80 has a plurality of feet 84 with stud apertures 85 therein which are aligned with the threaded studs 83. The studs 83 extend through the stud apertures 85 in the feet 84 and the visor 80 is fastened in place utilizing a plurality of nuts. Alternatively, other fastening means and arrangements may be utilized. Finally, the lens cover 31 is replaced on the fixture head 30 as previously described and as shown in FIGS. 12A and 13. According to one alternative embodiment, the lens cover 31 and visor 80 may be integrated into a single part for mounting on the fixture head 30.

As further shown in FIGS. 12A and 13, the visor 70 is tapered from a thicker end near the front of the fixture head 30 to a thinner end near the rear of the fixture head 30. As depicted in FIG. 12A, when the fixture head 30 is positioned horizontally at 0 degrees the upper edge of the visor 80 tilts from front to rear along the fixture head 30. This inhibits direct viewing of the top of the fixture head and glare associated therewith. Accordingly, when the fixture is tilted downward, for instance at 12 degrees to cast a long throw of light, the upper edge of the visor 80 is substantially horizontal or parallel with a floor or other substrate below which provides an aesthetically pleasing finish. Further, the visor 80 inhibits viewing of the upper portion of the fixture head 30 so that those standing near the indirector fixture 10 do not see a glare. In other words, when the fixture head 30 is tilted forward up to about 12 degrees, the visor 80 blocks glare and as a result eye strain is reduced.

Figure 14:
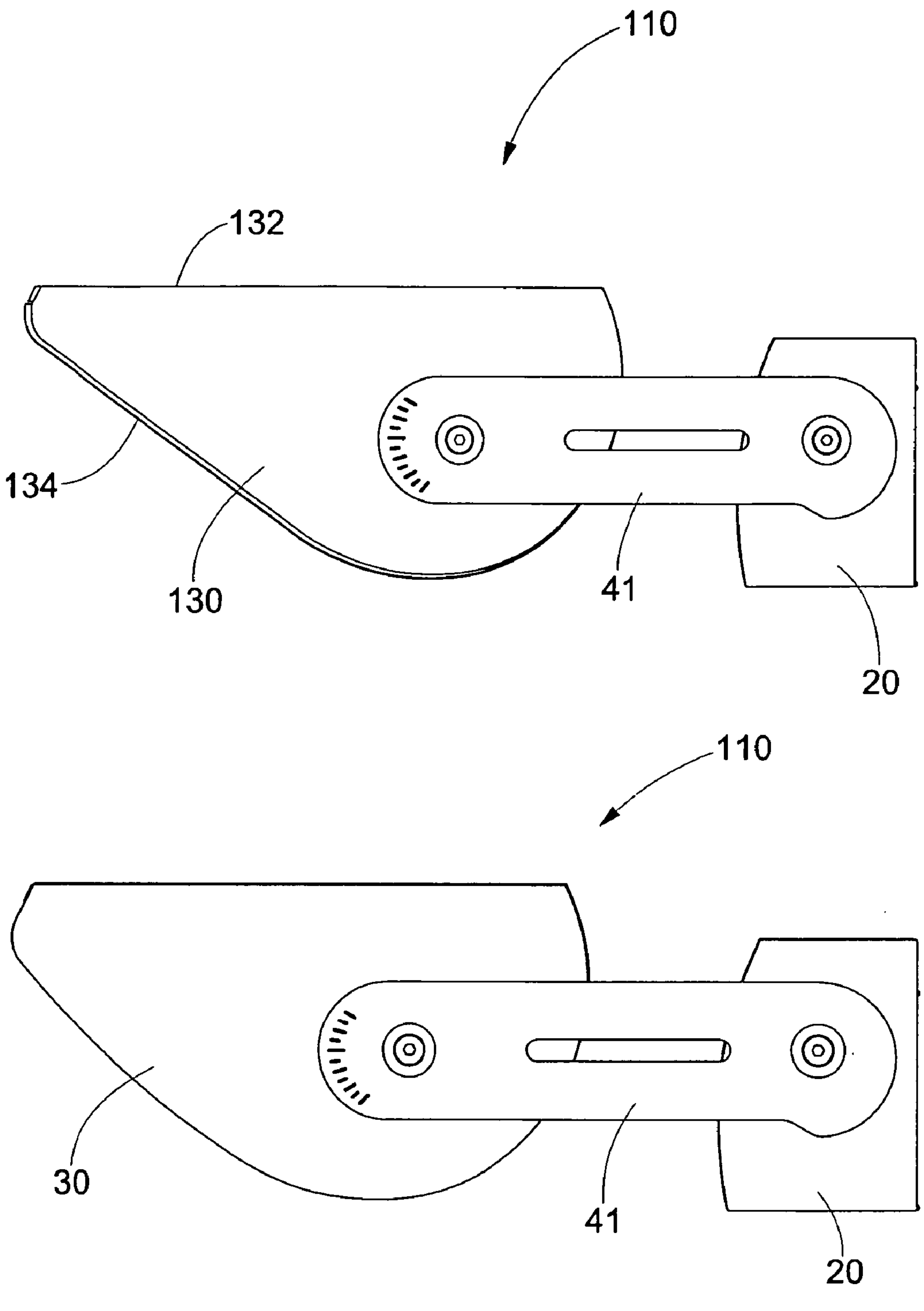
FIG. 14 is a side view of a reflector housing sidewall of a secondary embodiment of the present invention.
Figure 15:
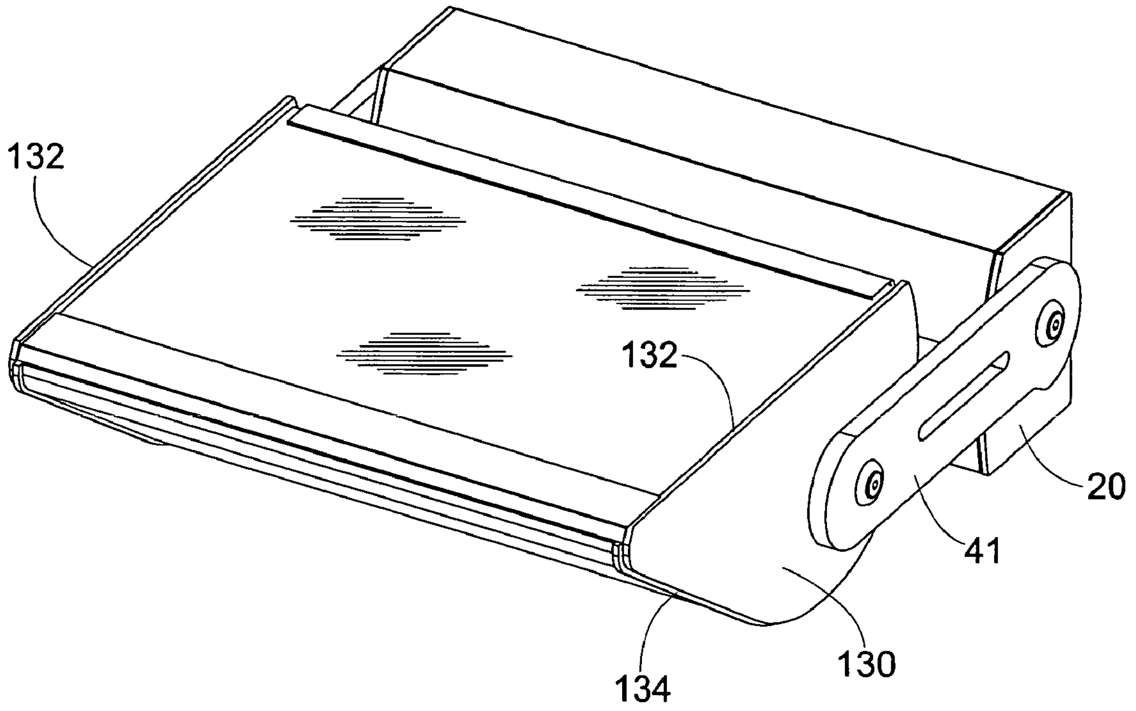
FIG. 15 is a side view of a light fixture of FIG. 1 and a side view of an indirector light fixture having an integral visor.

According to an alternative embodiment, the inventors have found that it is also desirable to form a fixture head wherein a visor is integrally formed with the fixture head rather than manufacturing and installing the visor separately as previously described and shown in FIGS. 12 and 13. Referring now to FIG. 14, a side view of an alternative fixture 110 and fixture head 130 is shown juxtaposed to the fixture head 30 and a perspective view of the fixture head 130 are shown respectively. The fixture head 130 utilizes two structural changes in order to integrate a visor into the fixture head of the present design. Referring also to FIG. 15, first, an upper edge 132 of the fixture head 130 is lengthened in order to inhibit viewing of the upper portion of the fixture head 130. In other words, glare is inhibited blocked by lengthening the upper edge 132, and therefore the fixture head 130 may be tilted forward up to about 12 degrees. BY lengthening the upper edge 132, a gap is formed at the front of the fixture head 130. Such gap forms an integrated visor preventing direct glare. Otherwise stated such design acts as a glare shield without limiting ability to throw light or requiring further modification.

A second structural change is also embodied in the fixture head 130. With the upper edge 132 lengthened, a lower front surface 134 of the fixture head 130 has a flatter profile, rather than curved as utilized in the fixture head 30 to compensate for the increased length of edge 132. And as a result, a flat diffused glass may be positioned within the flat lower front 134 of the fixture head 132 allowing a soft light to come from a lower portion of the fixture head 30. Further, these structural changes to the fixture head 130 do not require modifications to the interior parts of the fixture and therefore the same parts utilized in the fixture head 10 maybe utilized in the present alternative fixture head 130 which is preferable for manufacturing.

The present inventive development further provides the advantage of dual pivot points between the ballast housing 20 and the reflector housing 30. As shown in FIGS. 5A-5C, the support arm 40 pivots at the ballast housing 20 providing a first pivot between the ballast housing 20 and support arms 40,41 thus providing a first method of adjustment. According to the present embodiment, the pawl 24 and ratchet teeth 47 allow adjustment of the support arm 41 through a plurality of preset angles. For example, the support arm of the exemplary design is movable through 7 positions each at 15 degrees intervals from 30 degrees below horizontal to 60 degrees above horizontal, although various other increments and ranges are foreseeable. Otherwise stated, the ratchet teeth may define the preset angles. At a second end of the support arm 41 is the hinge pin 62 providing for a second adjustment between the support arms 40,41 and reflector housing 30. As shown in FIG. 11*b*, the support arm has a plurality of indicia 63 which may be used along with hinge pin 62 to make a second adjustment between the reflector housing 30 and ballast housing 20. Thus the present invention provides two adjustments between the ballast housing 20 and reflector housing 30. In combination with the adjustment about hinge pin 62, the ratchet and pawl mechanism provide dual pivot points to allow a plurality of adjustments. The support arm 41 may be pointed upward, downward, or horizontal while the reflector housing 30 may be adjusted through various angles to obtain a desirable light dispersion. In other words, the fixture head or reflector housing 30 may be moved relative to the ballast housing 20 and relative to the fixture arm 40,41.

Referring now to FIG. 4, a third location for adjustment is located within the reflector housing 30. As previously indicated, an adjustment screw 32 and angle markings or indicia 37 are positioned along the inner surface of the reflector housing 30 in order to provide adjustment of the reflector 34. Thus, dual position arm adjustments between the ballast housing 20 and the reflector housing 30 provide varying positions which are aesthetically pleasing as well as adjustment of light. In addition, the reflector adjustment screw 32 allows for fine tuning of the light dispersion.

Figure 16:
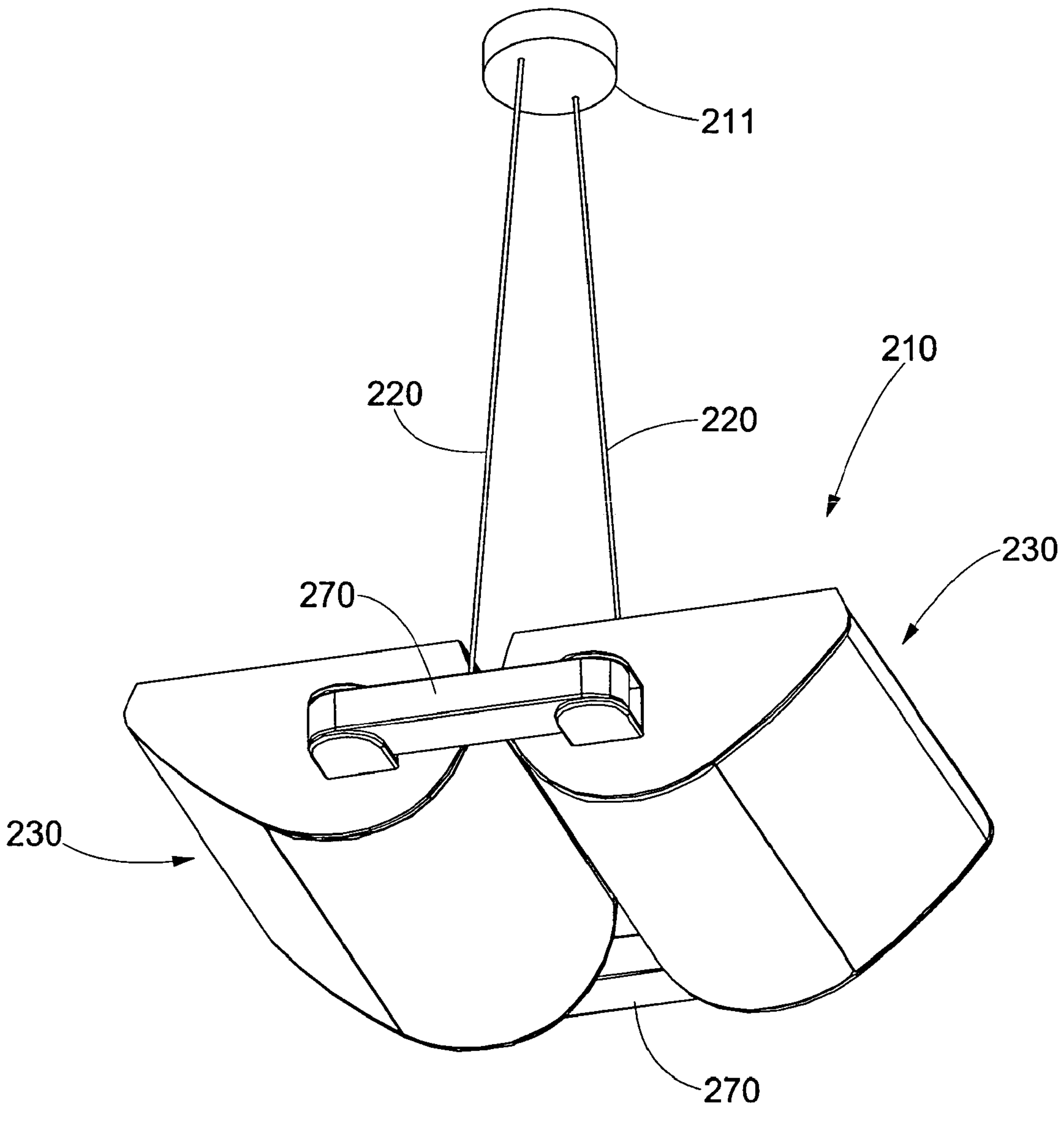
FIG. 16 is a perspective view of a pendant head assembly having two fixture heads.

A further embodiment of the present invention is depicted in FIG. 16 showing a pendant light assembly 210. According to the illustrative embodiment, at least two fixture heads 230 are shown connected by opposed support arms 270 in order to define a portion of the pendant assembly 210. An additional portion of the pendant assembly includes a cover plate 211, a mounting plate 212 (FIG. 20), a suspension device 220 such as pendant arms or cables, and a plurality of fixture heads 230. The cover plate 211 provides an aesthetically pleasing cover for the suspension devices 220 (FIG. 20) to engage structure within a ceiling for instance. The mounting plate 212 is hidden within the cover plate 211 and provides interconnection between the mounting structure within the ceiling and the suspension device 220.

Figure 17:
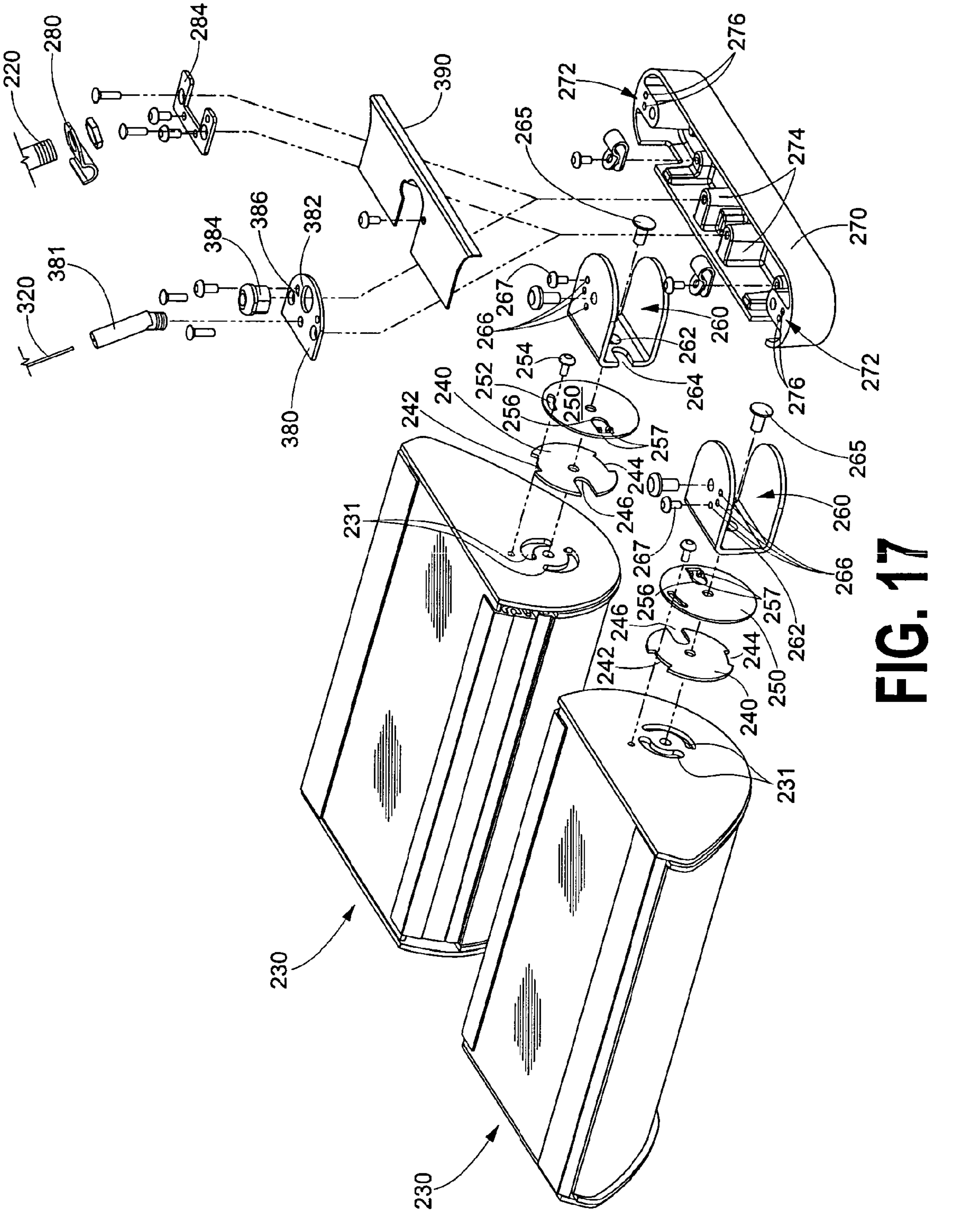
FIG. 17 is an exploded perspective view of the pendant head assembly of FIG. 16.

As shown in FIGS. 16-19 multiple fixture heads 230 may be mounted together in order to provide a pendant light fixture assembly 210. For purpose of this description, the fixture heads 230 may be understood to include a separate visor or an integrally formed visor, or may exclude the visor design. In other words the fixture heads 230 may include any of the fixture head designs previously described. Referring initially to FIG. 17, two fixture heads 230 are depicted defining the pendant assembly 210 and the connecting structures are shown in an exploded perspective view for ease of description. The fixture heads 230 have at least one wire slot 231 providing a path for electrical wire to move from the connecting arm to the fixture head 230. Adjacent the fixture head 230 is an arm disc gasket 240 which is circular in shape with a plurality of notches formed therein. The gasket 240 provides a seal for the fixture head 230 as well as a locking or gripping surface for the adjacent arm disc 250 so as to inhibit metal to metal contact between an arm disc 250 and fixture head 230. Along the upper and lower circumference of the gasket 240 are slots or notches 242,244, respectively providing clearance for an adjustment screw to move through to the fixture head 230. Between the upper and lower notches 242,244 is a substantially U-shaped clearance notch 246 for wire to pass through the gasket 240 and into the fixture head 230. The gasket 240 also comprises a central fastener aperture for fastening the gasket to the fixture head 230.

Moving outward from the gasket 240 is an arm disc 250 which is substantially circular in shape and may be formed of steel or metallic structure. The arm disc 250 includes a central fastening aperture for connection of the arm disc 250 to the gasket 240 and fixture head 230. The arm disc 250 also comprises a slot 252 for a fastener 254. The fastener 252, such as a screw, passes through the slot 252 and the slot 242 of the gasket 240 and connects to the fixture head 230. The fastener 254 provides for adjustment of the fixture head through an arc of up to about 15 degrees. Thus the slots 252 and 242 provide for movement of the fixture head 230 relative to an arm bracket 260. The arm disc 250 also comprises a wire aperture 256 allowing pass through of electrical conductive wiring to the fixture head 230. The wire aperture 256 has first and second tabs 257 which engage a wire slot formed in the arm bracket 260.

Figure 18:
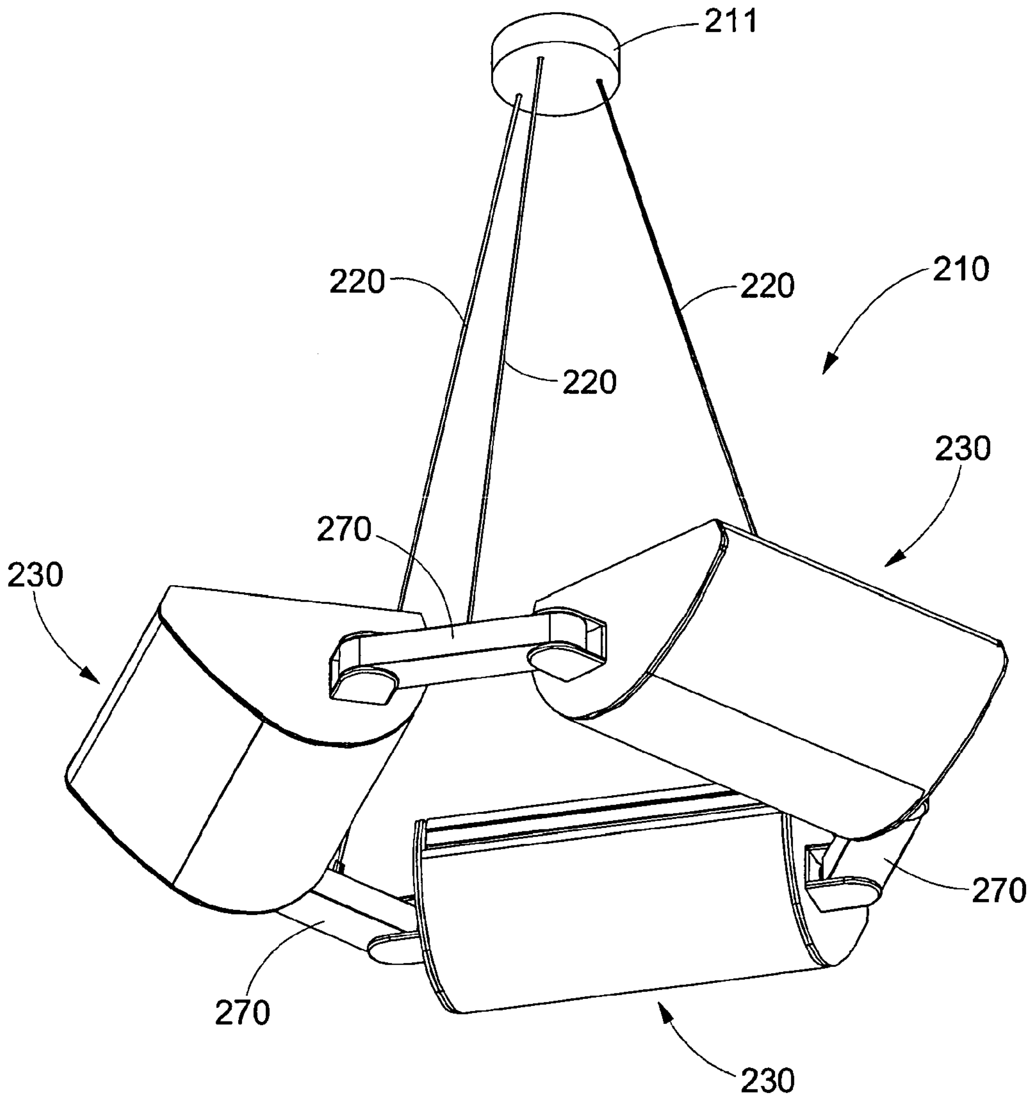
FIG. 18 is a perspective view of a pendent head assembly having three fixture heads.
Figure 19:
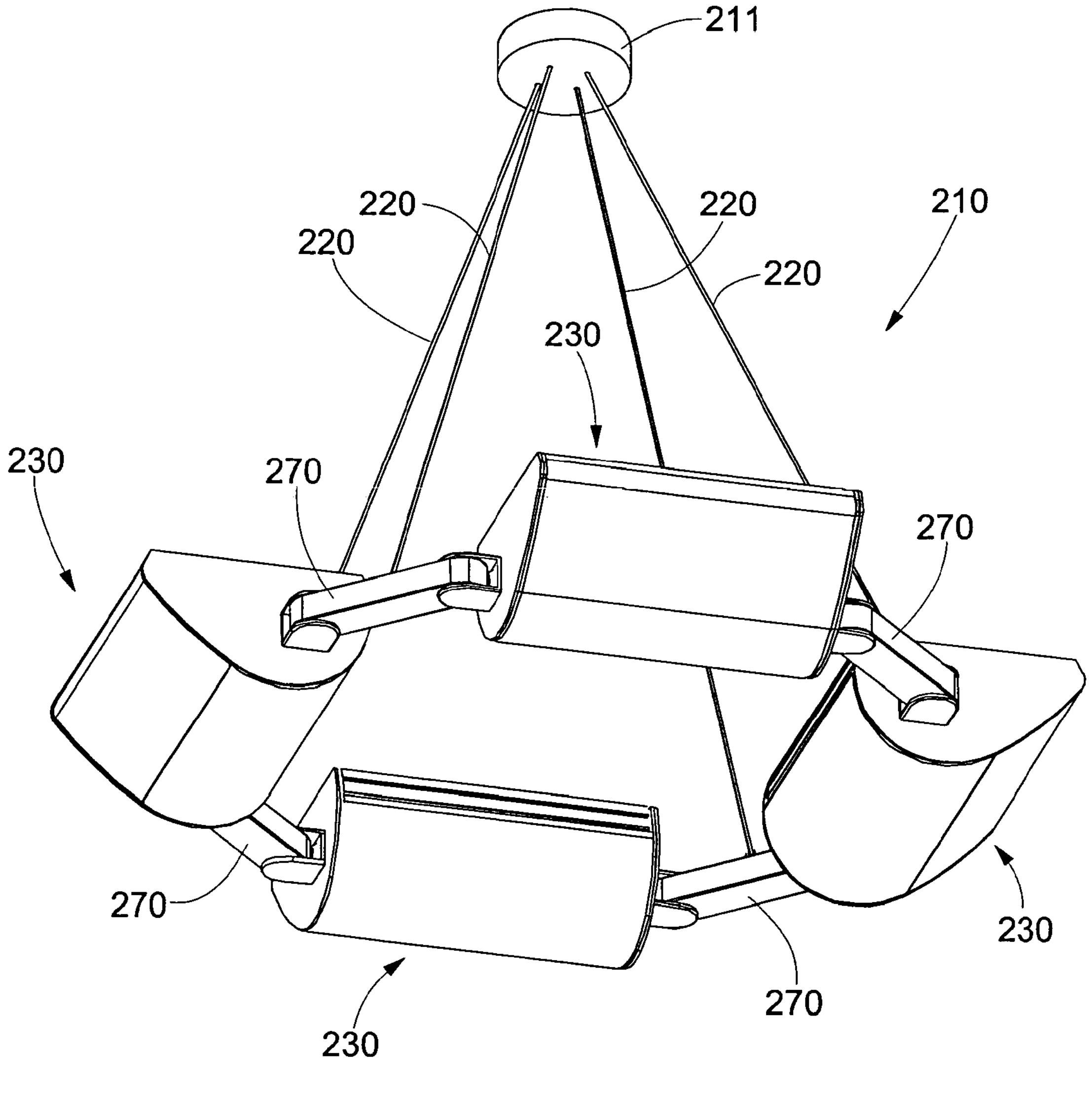
FIG. 19 is a perspective view of a pendent head assembly having four fixture heads.

Moving outward from the arm disc 250 is an arm bracket 260 which is substantially C-shaped formed by two substantially horizontal legs and one substantially vertical leg. Located in the substantially vertical leg is a fastening aperture 262 and a wire slot 264. A fastener 265 passes through the arm bracket 260, the arm disc 250 and the arm disc gasket 240 to interconnect these parts and provide a pivot point for movement of the fixture head 230. The wire slot 264 provides a path for electrical wire to move through the bracket 260 to the fixture head 230. In an upper surface of the arm bracket 260 there are a plurality of adjustment apertures 266 for positioning of the arms 270 at various angles between adjacent fixture heads 230. As one of ordinary skill in the art will understand by viewing FIGS. 16-19 the angle of fixture arms 270 will change, depending on the number of fixture heads 230 utilized in the pendant assembly 210. For example, as seen in FIG. 16, the fixture arms 130 are parallel where only two fixture heads are utilized. In FIG. 18, where three fixture heads 230 are utilized, with about 60 degrees between each fixture arm 270 and fixture head 230. And, in FIG. 19, where four fixture heads 230 are utilized, there are about 45 degrees spacing between each fixture arm 270 and the fixture head 230. The plurality of adjustment apertures 266 provide a position for each of the configurations depicted in FIGS. 16, 18, and 19 utilizing fastener 267 and additional apertures may be provided to accommodate angles associated with various configurations of fixture arms 270. Referring again to FIG. 17 also centrally located in the upper surface of the arm bracket 260 is a fastening aperture for connecting the arm bracket 260 to the fixture arm 270. The connection between the arm bracket 260 and fixture arm 270 defines a knuckle for pivotal movement about a vertical axis of a fastener, extending through the upper surface of arm bracket 260 and fixture arm 270.

Still referring to FIGS. 16-19, the fixture arm 270 is shown being received in the space between the upper and lower surfaces of the arm bracket 260 with a fastener passing there through and defining a substantially vertical pivot axis. The fixture arm 270 is elongate in shape having semi-circular ends and a substantially hollow interior portion. Within this hollow interior portion of the fixture arm 270, a plurality of wire splice connections may be made and hidden from view below. At interior ends of the fixture arm 270 are bosses 272 having apertures 276 for alignment with adjustment apertures 266 and which receive fastener 267 when a desirable pendent configuration is achieved. Also located in each of bosses 272 are apertures for receiving fasteners through central apertures in the upper surface of arm bracket 260 which fasten together of the arm brackets 260 and fixture arms 270 and define a knuckle for pivoting the fixture arm 270 relative to the arm bracket 260.

Also located in the fixture arm 270 are two centrally positioned bosses or towers 274 which are anchoring positions for connection of the pendent arm or pendent wire assembly, respectively shown in the upper right hand corner of FIG. 17. According to one embodiment of the present device, when the suspension device comprises a pendant arm 220, the lower end of the pendent arm 220 may be threadably connected to a stem hook 280 and a lock nut. A stem hinge 284 is substantially U-shaped comprising 3 legs such that each of two parallel legs are fastened to one of the towers 274. With the stem hinge 284 fastened to the towers 274, the third leg of the hinge 284 retains the stem hook 280 in place. Additional fasteners may be utilized to secure the stem hook 280 to the stem hinge 284 through the third leg of the hinge.

Referring still to FIG. 17, an alternative configuration of the pendent assembly is also shown utilizing a suspension device such as a pendent wire or cable 320. As depicted, a plate 380 is shown for attachment to the towers 274. Once the plate 380 is fastened to the towers within the arm 270, a neck 381 is fastened to the plate 380 by, for instance threaded connection. Within the neck 381 is a cable gripping portion to retain the cable in place. This design provides a primary retaining mechanism for the pendent assembly 210. The plate 380 has a curved edge having a centrally aperture 382 adjacent the curved edge allowing an electrical wire to pass there through. A strain relief element 384 is positioned within the aperture 382 in order to inhibit breakage of electrical wiring. According to the present embodiment, the strain relief element 384 is mushroom shaped and has a hollow interior, although this shape may be altered in accordance with the intended scope of the present invention. As pendant cables or wires 320 pass through neck 381 it is moved downward through the plate 380 and back upward through a cable aperture 386 in plate 380. With the cable positioned through in the cable aperture 386 a fastener is placed in the aperture 386 to lock the cable in place inhibiting the cable from losing supporting connection with the plate 380 and pulling through the neck 381. In other words this design provides a secondary or back-up retaining mechanism for holding the pendent assembly.

According to either embodiment, an arm cover 390 is fastened to the upper portion of the fixture arm 370 and covers a large portion of the hollow fixture arm 270. The cover has a notch 392 to allow the neck 381 or pendent arm 220 to pass there through. The arm cover 390 may comprise a plurality of shapes but generally functions to cover the upper portion of the fixture arm 270 such that wire splice connections therein are not exposed and thus inhibiting electrical shock and other hazards.

Figure 20:
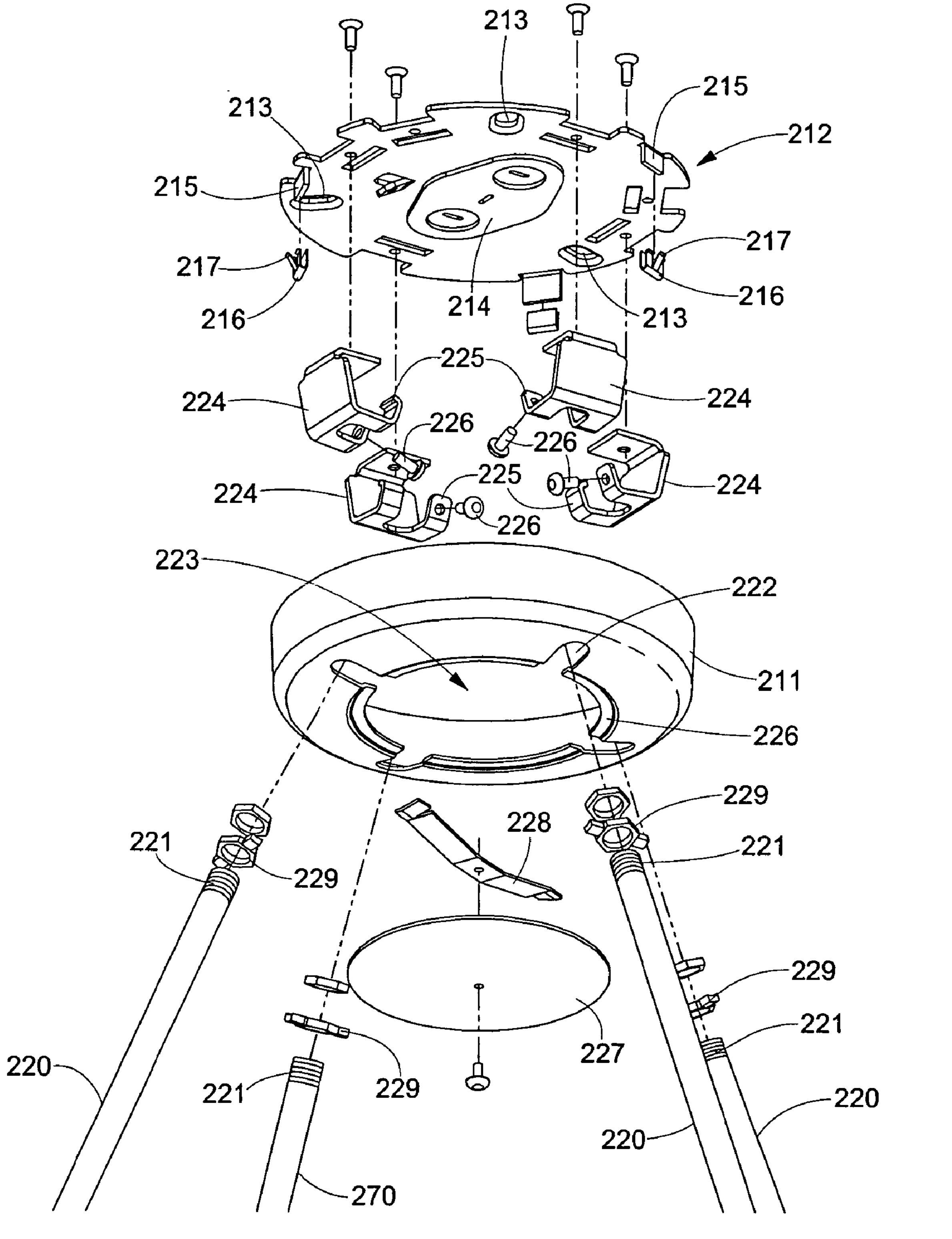
FIG. 20 is an exploded perspective view of the upper portion of the four head pendent assembly utilizing pendent arms.
Figure 21:
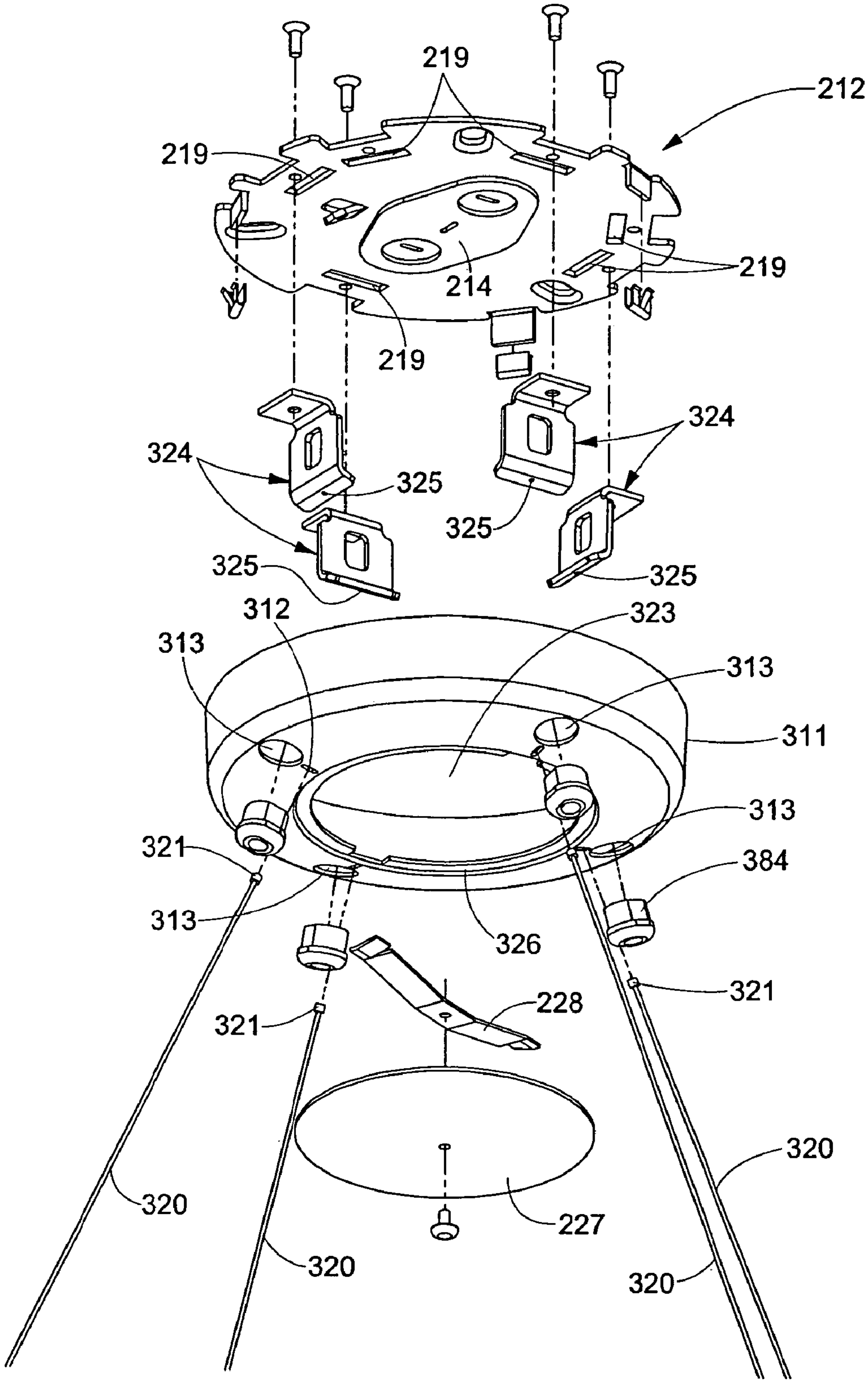
FIG. 21 is an exploded perspective view of the upper portion of the four head pendent assembly utilizing pendent wires.

Referring now to FIGS. 20-21, mounting assemblies are shown in exploded perspective view with improved detail in accordance with the alternative embodiments depicted in FIG. 17. As previously indicated, the mounting plate 212 is shown for connection to a structural support member within a ceiling. The mounting plate 212 is substantially round in shape, and fits within the plate cover 211, but may vary in shape according to the shape of the plate cover 211. The mounting plate 212 may include a plurality of fastening apertures 213 for fastening the mounting plate 212 to a structural member (not shown) or other structure located within the ceiling of a room.

Centrally located within the mounting plate 212 is at least one knockout 214 allowing electrical wires to pass through the plate from the junction box side of the mounting plate 212. As depicted in the illustrative embodiment of the mounting plate 212 may include multiple round knockouts in order to allow wires through different areas of the mounting plate 212 and compensate for the wire positioning in the junction box or may include a single diamond shaped knockout including the two round knockouts. Alternative knockout shapes may be utilized instead.

Circumferentially spaced about the mounting plate 212 are a plurality of tabs 215 which are folded downward. As depicted in FIGS. 20-21, the tabs 215 are substantially square in shape and are equidistantly spaced about the circumference of the mounting plate 212. The tabs 215 may be of varying shape as long as the tabs 215 will retain cover clips 216 thereon. The cover clips 216 are one-way clips and each have at least one projection 217 extending therefrom which engage the plate cover 212 and retain the plate cover 212 in place on the mounting plate 212 providing an aesthetically pleasing finish when seen from below. However, various designs may be utilized to connect plate cover 212 to the mounting plate 211.

Referring now to FIG. 20, fastened beneath the mounting plate 212 and depending therefrom are pendant arm mounting clips 224 providing an operable connection between the mounting plate 212 and pendant arms 220. The mounting clips 224 have an upper surface with at least one fastening aperture for fastening to the mounting plate 212. The mounting clips 224 have at least one claw 225 extending radially inwardly and upwardly from the lower portion of the mounting clip 224. More specifically, the mounting clips 224 have spaced claws 225 defining a space wherein a pendant arm or stem 220 may be positioned. As depicted in FIGS. 20 and 21, four suspension devices or pendant arms 220 are connected to the mounting clips 224. However, as shown in FIG. 16 two pendant arms may be utilized or as in FIG. 18 three pendant arms may be utilized. Based on the number of pendant arms utilized, the number of mounting clips 224 may be adjusted accordingly. For instance, in the embodiment shown in FIG. 16, only two mounting clips 224 would be necessary rather than the four shown in FIGS. 20 and 21. Positioned within the at least one claw 225 is a fastening aperture wherein a locking fastener 226 may be positioned to retain the stem 220.

Still referring to FIG. 20, the cover plate 211 is positioned, as previously described, by engaging the cover clips 216 so as to cover the mounting plate 212 and mounting clips 224. The plate cover 211 is depicted as substantially round in geometry but may be formed of various shapes not necessarily depicted herein which are aesthetically or architecturally pleasing. The cover plate 211 includes a central opening 223 as well as ears 222 extending from the perimeter of the central opening 223. A rim or projection 211*a* also extends radially inwardly from the perimeter of the central opening 223 and is slightly recessed or at a different height than the top surface of the plate cover 211. The ears 222 allow each pendant arm 220 to pass from below the cover plate 211 there through in order to engage the mounting clips 224. As may be gleaned from FIG. 20, the mounting clips 224 are aligned with the ears 222 as will be discussed hereinafter. Beneath the plate cover 211, a cap 227 is shown which covers the central opening 223 upon installation of the pendant assembly 210 and which fits within the recessed area so that the cap 227 is flush with the top surface of the plate cover 211. The cap 227 has a central fastening aperture wherein a fastener is positioned. However, alternative fastening configurations may be utilized. Above the cap 227 is a retaining arm 228 having a length at least greater than the diameter defined by the projection 226 extending from the central opening 223. The retaining arm 228 also comprises a centrally located fastening aperture. The arm 228 is positioned above the projection 211*a* and engaged by the fastener extending through the cap 227 so that the cap 227 is retained within the recess defined by the projection 226 and covering the central opening 223. In other words, the cap 227 is substantially flush with the surface of the cover plate 211.

Referring still to FIGS. 16 and 20, the suspension devices or pendant arms 220 are shown extending through the plate cover 211. The upper end of the pendant arms 220 include threaded portions 221 having flat wing nuts 229 fastened thereto. By threadably moving the flat wing nuts 229 up and down the threaded portion 221 of the pendant arm 220, modifications may be made to the height of the pendant assembly 210 with respect to a substrate below or with respect to the ceiling above. With the pendant arms 220 extending through the ears 222 and flat wing nuts 229 in place on the threaded portion 221 of pendant arms 220, each pendant arm 220 extends through a gap defined by the claws 225. Each of the flat wing nuts 229 are positioned within the opening defined by claws 225 of the mounting clip so that the flat wing nut is retained therein. The claw 225 inhibits horizontal movement of the flat wing nut 229 out of the gap in the mounting clip 224 while a fastener 226 positioned within a claw 225 inhibits vertical movement of the wing nut 229. Thus, the pendant arm 220 is locked in place within the mounting clip 224 and supported from the mounting plate 212 when each mounting clip is fastened to the mounting plate 212.

Referring now to FIG. 21, an alternative embodiment of the pendant assembly is depicted. The illustrative embodiment of FIG. 21 utilizes cables or wires 320 rather than rigid pendant arms 220 in order to hang the fixture heads (not shown). The pendent assembly utilizes a mounting plate 212 as previously described. The mounting plate 212 includes various rectangular apertures or slots 219 therein extending through the mounting plate. The slots 219 are spaced apart about 90 degrees from one another in order to accommodate a four cable pendent assembly. Additional slots 219 are provided so that various fixture designs maybe utilized. For example at least three slots are provided so that mounting clips may be positioned at 120 degrees intervals to accommodate three fixture heads 230 or 180 degrees apart for two fixture heads 230. In other words, the plurality of slots 219 accommodate various pendent assembly designs. A S-shaped mounting clip 324 having three legs, including an upper horizontal leg, a lower horizontal leg, and a vertical connecting leg, depends from each slot 219. More specifically, the upper leg of each clip 324 is positioned through a slot 219 so that the upper leg rests on an upper surface of the mounting plate 212. A fastener extends through both the upper leg of clip 324 and the mounting plate 212 to secure each clip 324 to the mounting plate 212.

Within the lower leg of each mounting clip 324 is a wire aperture 325 through which a pendent wire or cable extends. At an upper end of the pendent cable 320 is a swage or projection 321 having a diameter larger than wire aperture 325. Accordingly, the cable 320 is positioned through the mounting clip 324 from the upper side of the lower leg and through aperture 325. The swage 321 engages mounting clip 324 such that the engagement inhibits further movement of the cable 320 through the mounting clip 325. In other words, the cable 320 is suspended from the mounting clip 324.

Still referring to FIG. 21 and moving downward, an alternative cover plate 311 is depicted for use with the cable mount pendent assembly. The cover plate 311 covers the mounting plate 212 and mounting clips 324 to provide an aesthetically pleasing finish. The cover plate 311 has a central aperture 323 with a rim 326 extending radially inward from an edge of aperture 323. The rim 326 includes diametrically opposed notches therein which will be discussed hereinafter. Also located on the cover plate 311 are cable or wire apertures 312 through which the cable 320 may extend to the pendent fixture heads 230. Each cable aperture 312 is spaced apart about 90 degrees from adjacent apertures 312. Adjacent each cable aperture 312 is a strain relief aperture 313 which provides a location for a strain relief fitment 384. As previously indicated, the strain relief fitment 384 is substantially mushroom shaped having a hollowed passage extending there through. Further, the strain relief fitments 384 and apertures 313 are spaced apart about 90 degrees and adjacent each cable aperture 312 so that each electrical wire can be tied or fastened to each cable 320.

Referring still to FIG. 21, covering the aperture 323 in the plate cover 311 is the cap 227 which fits against the rim 326 so that the plate cover 311 and cap 227 provide a smooth pleasing appearance along the lower visible surface of the cover 311. The cap 227 is fastened to the retaining arm 228 by a fastener. The retaining arm 228 has a length that is longer than the inner diameter of the rim 326 so that the retaining arm 228 is moved above the rim 326 through the diametrically opposed notches therein. Once the retaining arm 228 is above the rim 326, the retaining arm 228 is rotated through some arc less than 180 degrees and preferably about 90 degrees so that the retaining arm 228 cannot move below the rim 326 through the notches therein.

Figure 22:
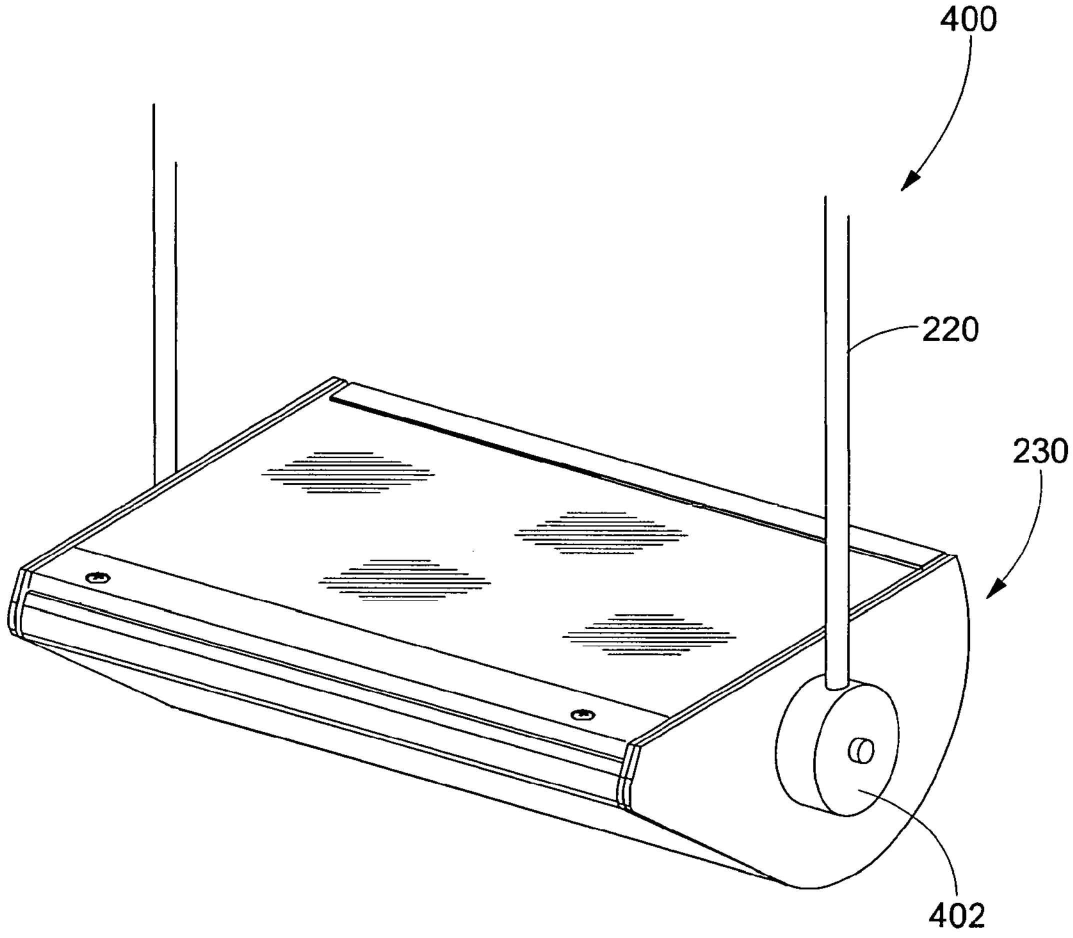
FIG. 22 is a perspective view of a single fixture head pendent.

Referring now to FIG. 22, one final alternative embodiment is depicted. The design utilizes a single fixture pendent assembly 400 utilizing fixture head 30 or the fixture head 130 having an integral visor. For ease of description, the fixture head will be referred to as fixture head 130, although it should be understood that others maybe utilized. The assembly 400 includes a pair of cables 220 pendant arms 220 or cables 320 depending from a ceiling, beam, or other structural member or members and connected to opposed sides of the fixture head 130. Alternatively, rods or stems 220 may be utilized to depend from above the fixture head 130. Connected to opposed sides of the fixture head 130 are pivotable clamps 402 which receive the cables 320 or stems 220. The clamps 402 are pivotally connected to the pendent fixture head 130 so that the pendent head 130 may be adjusted in order to vary the dispersion of light throughout a room. Preferably the pendant light may be pivoted either upward or downward from the horizontal about 60 degrees to vary light dispersion.

In addition, a plurality of single head pendent fixture assemblies 400 may be hung in a substantially linear end-to-end fashion, for instance in a long hall or walkway. In this embodiment the clamps 402 are removed and replaced with the knuckles or arm brackets 260. Interconnecting the fixture heads may be the fixture arms 270. Such interconnection may be performed because of the pivotal connection between the arm brackets 260 and fixture arm 270 which allows the fixture arms to be disposed at various angles to the fixture heads 230. Alternatively, the pendent assemblies 400 may be arranged in a zig-zag or jagged pattern and interconnected using the arm brackets 260 and fixture arms 270.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the amended claims.

We claim:

1. A light fixture in combination with a light leveling mechanism, comprising:

an adjustable light fixture comprising:

a reflector housing and a ballast housing;

at least one support arm affixed to said ballast housing and said reflector housing;

a reflector and a lamp positioned within said reflector housing;

said adjustable light fixture having at least one adjustment between said reflector housing and said ballast housing;

a light leveling device comprising:

a body having a plurality of sides, each of said plurality of sides defining a preselected reference angle;

a liquid and air filled leveling chamber within said body for positioning said reflector housing at least one of said preselected reference angles.

2. The combination of claim 1, said preselected reference angle being a horizontal orientation.

3. The combination of claim 1, said preselected reference angles being a non-horizontal orientation.

4. The combination of claim 1 wherein each of said plurality of sides defines a preselected reference angle.

5. The combination of claim 1 wherein one of said plurality of sides is a zero degree angle for use with said liquid and air filled chamber to horizontally level said reflector housing.

6. The combination of claim 1 wherein said body is a five-sided polygon.

7. A light leveling device in combination with an adjustable light fixture, comprising:

a polygon-shaped body having a plurality of sides, each of said sides arranged at a corresponding preselected angle;

said body having a spirit level located between said plurality of sides;

at least one of said sides used with said spirit level to indicate when said at least one side is disposed at said corresponding preselected angle;

an adjustable light fixture having a reflector housing adapted for pivotal movement;

at least one of said plurality of sides of said body positionable along a surface of said adjustable light fixture to position said adjustable light fixture at said corresponding preselected angle.

8. The light leveling device combination of claim 7, said at least one side having a zero degree angle for rendering a horizontal orientation.

9. The light leveling device combination of claim 7 further comprising a plurality of sides for use with said spirit level to obtain a preselected orientation.

10. The light leveling device combination of claim 7, said body having five sides.

11. The light leveling device combination of claim 10 wherein each of said five sides has a preselected angle.

12. The light leveling device combination of claim 11 wherein each of said five preselected angles differs from the others of said preselected angles.

13. A process for using a light leveling device, comprising the steps of:

mounting a light fixture;

adjusting a support arm connecting a ballast housing and a reflector housing to a desired angle at a connection between said ballast housing and said support arm;

placing a light leveling mechanism on a lens cover extending across said reflector housing, said light leveling mechanism comprising:

a body having a polygonal shape defined by a plurality of sides;

an integrated spirit level located on said body and positioned to indicate a horizontal level along at least one side of said body;

each of said sides being formed at a preselected reference angle;

wherein said reference angles differ for each of said sides of said body;

adjusting an angle of said reflector housing with a reflector housing adjustment;

centering a leveling bubble in order to position said reflector housing at a preselected reference angle; and, tightening said reflector housing to said support arm.

14. The process of claim 13 further comprising the step of selecting one of a plurality of preselected reference angles from said light leveling mechanism.

* * * * *